US006322110B1

(12) United States Patent
Banker et al.

(10) Patent No.: US 6,322,110 B1
(45) Date of Patent: Nov. 27, 2001

(54) TUBULAR CONNECTION

(75) Inventors: Edward O. Banker; Erich F. Klementich, both of Houston, TX (US)

(73) Assignee: Marubeni Tubulars, Inc., Houston, TX (US)

( * ) Notice: Subject to any disclaimer, the term of this patent is extended or adjusted under 35 U.S.C. 154(b) by 0 days.

(21) Appl. No.: 09/131,523

(22) Filed: Aug. 10, 1998

Related U.S. Application Data

(60) Provisional application No. 60/055,325, filed on Aug. 11, 1997, and provisional application No. 60/074,358, filed on Feb. 10, 1998.

(51) Int. Cl.[7] ............................... F16L 15/00
(52) U.S. Cl. ............... 285/334; 285/333; 285/355; 285/390
(58) Field of Search ........................... 285/333, 334, 285/355, 390

(56) References Cited

U.S. PATENT DOCUMENTS

| | | | |
|---|---|---|---|
| 1,927,656 | 9/1933 | Eaton et al. | 285/146 |
| 2,006,520 | 7/1935 | Stone et al. | 285/146 |
| 2,259,232 | 10/1941 | Stone | 308/4 |
| 2,772,102 | 11/1956 | Webb | 285/334 |
| 2,893,759 | 7/1959 | Blose | 285/334 |
| 2,907,589 | 10/1959 | Knox | 285/95 |
| 3,224,799 | 12/1965 | Blose et al. | 285/334 |
| 3,359,013 | 12/1967 | Knox et al. | 285/13 |
| 3,856,337 | 12/1974 | Ehm et al. | 285/334.4 |
| 3,870,351 | 3/1975 | Matsuki | 285/334 |
| 4,009,893 | 3/1977 | Schatton et al. | 285/110 |
| 4,121,862 * | 10/1978 | Greer | 285/333 |
| 4,161,332 | 7/1979 | Blose | 285/334 |
| 4,244,607 | 1/1981 | Blose | 285/92 |
| 4,330,142 | 5/1982 | Paini | 285/256 |
| 4,384,737 | 5/1983 | Reusser | 285/334 |
| 4,398,756 | 8/1983 | Duret et al. | 285/334 |
| 4,444,421 | 4/1984 | Ahlstone | 285/86 |
| 4,494,777 | 1/1985 | Duret | 285/55 |
| 4,508,375 | 4/1985 | Patterson et al. | 385/334 |
| 4,538,840 | 9/1985 | DeLange | 285/333 |
| 4,600,224 | 7/1986 | Blose | 285/334 |
| 4,611,838 | 9/1986 | Heilmann et al. | 285/331 |
| 4,629,221 | 12/1986 | Lumsden et al. | 285/328 |
| 4,629,224 | 12/1986 | Landriault | 285/334 |
| 4,707,001 | 11/1987 | Johnson | 285/332.3 |
| 4,728,129 | 3/1988 | Morris | 285/334 |
| 4,730,857 | 3/1988 | Schwind | 285/390 |
| 4,822,081 | 4/1989 | Blose | 285/334 |
| 4,915,426 | 4/1990 | Skipper | 285/286 |
| 4,917,409 | 4/1990 | Reeves | 285/334 |
| 4,928,999 | 5/1990 | Landriault et al. | 285/113 |
| 4,958,862 | 9/1990 | Cappelli et al. | 285/334 |
| 5,092,635 * | 3/1992 | DeLange et al. | 285/334 |
| 5,154,452 | 10/1992 | Johnson | 285/333 |
| 5,348,350 * | 9/1994 | Blose et al. | 285/334 |
| 5,462,315 | 10/1995 | Klementich | 285/24 |
| 5,492,375 * | 2/1996 | Smith | 285/334 |
| 5,516,158 * | 5/1996 | Watts | 285/333 |
| 5,549,336 * | 8/1996 | Hori et al. | 285/333 |
| 5,709,416 * | 1/1998 | Wood | 285/333 |
| 5,829,797 * | 11/1998 | Yamamoto | 285/333 |
| 6,010,163 * | 1/2000 | Cerruti | 285/333 |

FOREIGN PATENT DOCUMENTS

| | | | |
|---|---|---|---|
| 2438387 * | 2/1976 | (DE) | 285/333 |
| 1130913 | 2/1957 | (FR) . | |
| 1173471 | 12/1969 | (GB) . | |
| 500468 | 4/1976 | (SU) . | |
| 9215815 | 9/1992 | (WO) . | |

* cited by examiner

*Primary Examiner*—Teri Pham Luu
(74) *Attorney, Agent, or Firm*—Conley, Rose & Tayon, P.C.

(57) ABSTRACT

The tubular connection includes a pin member having external tapered threads extending from a pin nose to a pin base and a box member having internal tapered threads extending from a box base to a box nose. The tapered threads are square or near square threads having stab and load flanks with accommodating grooves. The stab flanks have corner chamfers which engage upon stabbing the pin member into the box member. The corner chamfers increase the clearances between the threads and grooves and guide the crests to the root openings upon relative rotation of the pin and box members. The stab flanks may have an increased thread width at the thread pitch line forming cam flanks which cam the threads into the grooves. The crests and roots of the threads interferingly engage. The pin nose and box base engage to form a metal-to-metal seal and a primary torque shoulder which during power tight make-up causes the load to shift from the stab flanks to the load flanks. The pin nose and box base lock up such that upon the application of further torque, the threads lock up from the pin nose back to the pin base thereby transferring substantially all of the remaining applied torque to the threads whereby the seal becomes insulated from any additional make up torque.

51 Claims, 9 Drawing Sheets

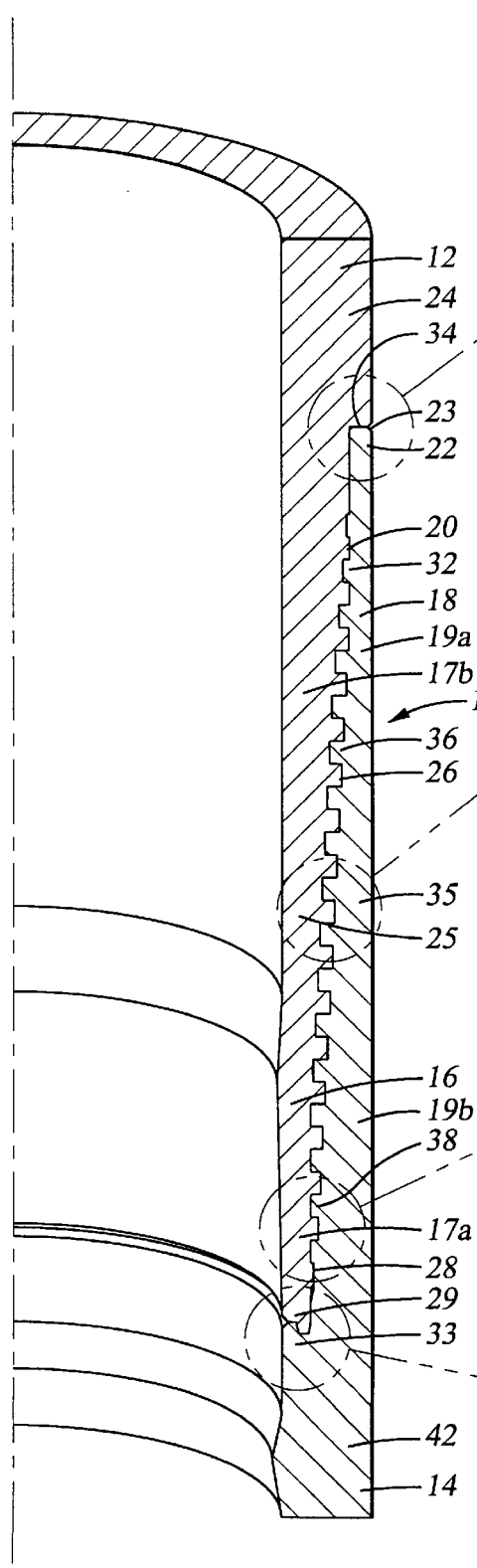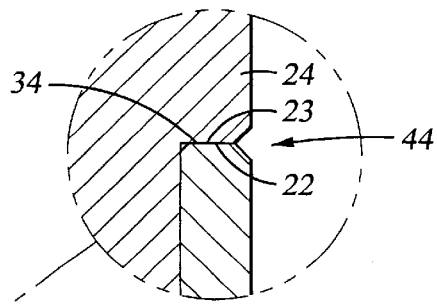
Fig. 1A
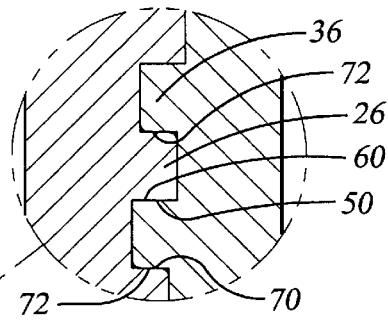
Fig. 1B
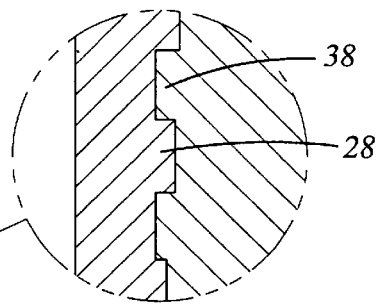
Fig. 1C
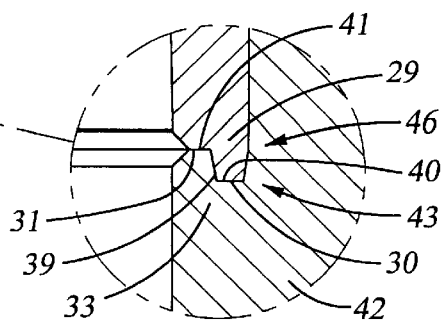
Fig. 1
Fig. 1D

TUBULAR CONNECTION

RELATED APPLICATIONS

This present application claims the benefit of 35 U.S.C. 111(b) provisional application Serial No. 60/055,325, filed Aug. 11, 1997 and entitled Self-Regulating, Torque-Resistant Threaded Connection and of 35 U.S.C. 111(b) provisional application Serial No. 60/074,358, filed Feb. 10, 1998 and entitled Threaded Connection.

BACKGROUND OF THE INVENTION

The present invention relates to tubular connections and more particularly to threaded tubular connections employed in joining lengths of pipe or joints of the kind commonly used in the oil and gas industry. In particular, the tubular connection of the present invention is a self-regulating, torque-resistant, threaded connection.

The trend in the oilfield is to minimize the diameter of pipe connections and to conserve borehole diameter. Two types of oilfield connections, namely integral flush joints and slim line high performance connections, have been utilized for these purposes. The outer diameter of a flush joint connection is substantially the same as the outside diameter of the body of the pipe. In other words, the connection is contained within the wall thickness of the pipe body. The outside diameter of conventional pipe couplings are typically 10 to 13% greater than the wall thickness of the pipe body. The outside diameter of a slim line high performance connection is generally 2 to 3.5% greater than that of the body of the pipe. Slim line high performance connections may be manufactured with or without cold swaged sections; hot-forged upset; and couplings. Though not undergoing as many make-up and break-out cycles as drill pipe, tubing connections must also remain serviceable after repeated makeups. So must casing connections to a lesser degree. An emerging technology, drilling with casing, requires casing connections with the added performance attributes of drill pipe tool joints.

U.S. Pat. Nos. 4,009,893; 4,538,840; 4,570,892; 4,611,838; 4,629,221; and 4,629,224 disclose various types of connections for tubular members having interfitting portions which serve to seal the connection. For example, U.S. Pat. No. 4,611,838 of Mannesmann discloses an annular end face of the pin member for opposing an annular shoulder of the box member, lying in planes transverse to the pipe axis. The pin member has an unthreaded annular bulge which engages an unthreaded frustoconical peripheral zone on the box member to form a seal.

A major deficiency in slim line and flush-type connections is their extremely low compression rating. Typically the flank angles of prior art threads are large, which results in large clearances between the compressive load bearing thread surfaces at full make up. Further as the flank angles are reduced, the clearances between the threads must be increased to permit the threads to stab into the grooves upon makeup. Thus, prior art connections provide a large clearance between the flanks of the threads. Large clearances between the threads permit movement between threads under cyclic loads and thus do not achieve a tight connection under cyclic loads. Large flank angles and thread clearances weaken the connection in compression. Prior art connections may have a 25 to 30% compression efficiency with a 60% tension efficiency. It also causes the connection to be weak in bending. Bending is compression on the inside of the connection and tension on the outside of the connection.

Square threads have substantially no flank angle and therefore are desirable because they provide good tension and compression load transfer. But in order for square threads to stab, the thread flank clearances must be so large that contact between the load flanks and stab flanks can not be achieved upon make-up. Thus, it is commonly believed that it is not possible to insert a square thread, including a tapered square thread, into an accommodating groove without having prohibitively large thread flank clearances.

Further it is commonly believed that for a thread to be "stabbable" and "machinable" a hook thread must have an included angle of 15° or more, that a non-hook thread, such as API buttress thread, must have an included angle of 13° or more and that a power thread such as a stub Acme thread or API X-line thread must have an included angle of 12° or more. Square threads cannot be easily manufactured, particularly in small diameter connections. Therefore these prior art threads require these minimum included angles to be stabbable and be machinable. The prior art connections with modified square threads use variable width threads to permit the square threads to be stabbed.

The prior art wedge thread or dove-tailed thread was developed to increase thread contact and achieve locking threads. A wedge thread is a thread having load and stab flanks which have different helix angles, i.e. different leads. Since their pitch is cut off two leads, wedge threads have a variable pitch. Wedge threads obtain their wedging by monotonically increasing the thread within the groove as one member is rotated with respect to the other member. Wedge threads mate together by rotational and then axial movement. The wedging of a wedge thread occurs along the axial length of the threads with a larger thread width being received into a smaller root opening. Connections using wedge threads produce torsional resistance between the threads due to the different leads between the load and stab flanks, i.e. a dovetail, wedge-type thread. However, a wedge thread profile requires multiple machining passes to cut the thread.

The present invention overcomes the deficiencies of the prior art.

SUMMARY OF THE INVENTION

The tubular connection of the present invention includes a pin member having tapered, external threads and a box member having tapered, internal threads, both sets of threads having the same constant helix angle, i.e. a constant lead for both stab and lead flanks, i.e. a constant pitch thread. The threads include run-in threads, full height threads, and run-out threads which extend from the nose of the pin and box members to the base of the pin and box members. The threads are square or near square threads forming accommodating grooves therebetween. The threads have crests and roots with minimal interfering contact and stab and load flanks with the stab flanks having a greater flank angle than the load flanks. Further, the stab flanks have corner chamfers for increasing the thread clearances for stabbing the threads into the grooves. The stab flanks may also include an increased thread width at the pitch line to form a cam flank extending from the corner chamfer to the regular stab flank which extends to the radius at the root of the thread.

The pin nose and box base form a metal-to-metal seal system and a primary torque shoulder. The pin nose includes an annular outer tooth-like member forming a first cylindrical surface, a first fistoconical surface, a first shoulder and a second shoulder. The box base includes an inner annular tooth-like member forming a second cylindrical surface, a second frustoconical surface, a third shoulder and a fourth shoulder. The metal-to-metal seal is formed by the engagement of the interfering first and second cylindrical surfaces and first and second frustoconical surfaces. The primary torque shoulder is fonned by the engagement of the first, second, third and fourth shoulders.

Upon assembly of the connection, the threaded pin member is stabbed into the treaded box member. In the stab position, the comer chamfers on the stab flanks engage to self-center the pin member within the box member. The corner chamfers increase the clearances between the threads and grooves. During initial assembly, the pin and box members are rotated relative to each other with the comer chamfers guiding the crests to the root openings. The cam flanks then cam the square threads on the pin and box member into the accommodating grooves on the corresponding pin and box member. As the seal surfaces on the pin nose and box base engage, a reaction force causes a shifting of thread contact from the stab flanks to the load flanks. As the rotation continues, then the crests and roots engage. The applied torque must increase to continue to force the pin and box members together. As the force increases, the pin member is placed in compression and the box member is placed in tension. This causes the clearance between the stab flanks to close. As the seal surfaces completely mate, the pin nose stops rotation prior to the final make up of the connection thereby transferring substantially all the remaining applied torque to the threads, which sequentially lock from the pin nose toward the pin base. Ultimately, after the primary torque shoulder completes engagement, a secondary torque shoulder can be formed between the box nose and pin base. In the final make-up position, there is flank to flank contact at the stab flank thread pitch lines which forms a helical band of contact between the stab flanks.

In the final make-up position, the bearing stress loads are evenly distributed over the entire thread length. The metal-to-metal seal assembly is insulated from the make up torque such that torque resistance increases with additional make up torque.

The present invention produces a slim line high performance connection with the performance characteristics of threaded and coupled connections, integral flush joint connections with the performance of typical slim line high performance connections, and threaded and coupled or upset integral joints with performance better than or at least equal to conventional threaded and coupled or upset integral joints, but with a connection outside diameter only barely larger, i.e. 0.2 to 2.2 inches, than that of the pipe body.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1 is a schematic view, partially in cross-section, of a connection for use with the present invention;

FIG. 1A is an enlarged detail view of the secondary outside torque shoulder of the connection of FIG. 1;

FIG. 1B is an enlarged detail view of the full height threads of the connection of FIG. 1;

FIG. 1C is an enlarged detail view of the run-in, run-out thread of the connection of FIG. 1;

FIG. 1D is an enlarged detail view of the primary inside torque shoulder and locked, metal-to-metal seal system of the connection of FIG. 1;

DESCRIPTION OF THE PREFERRED EMBODIMENTS

Figure 2:
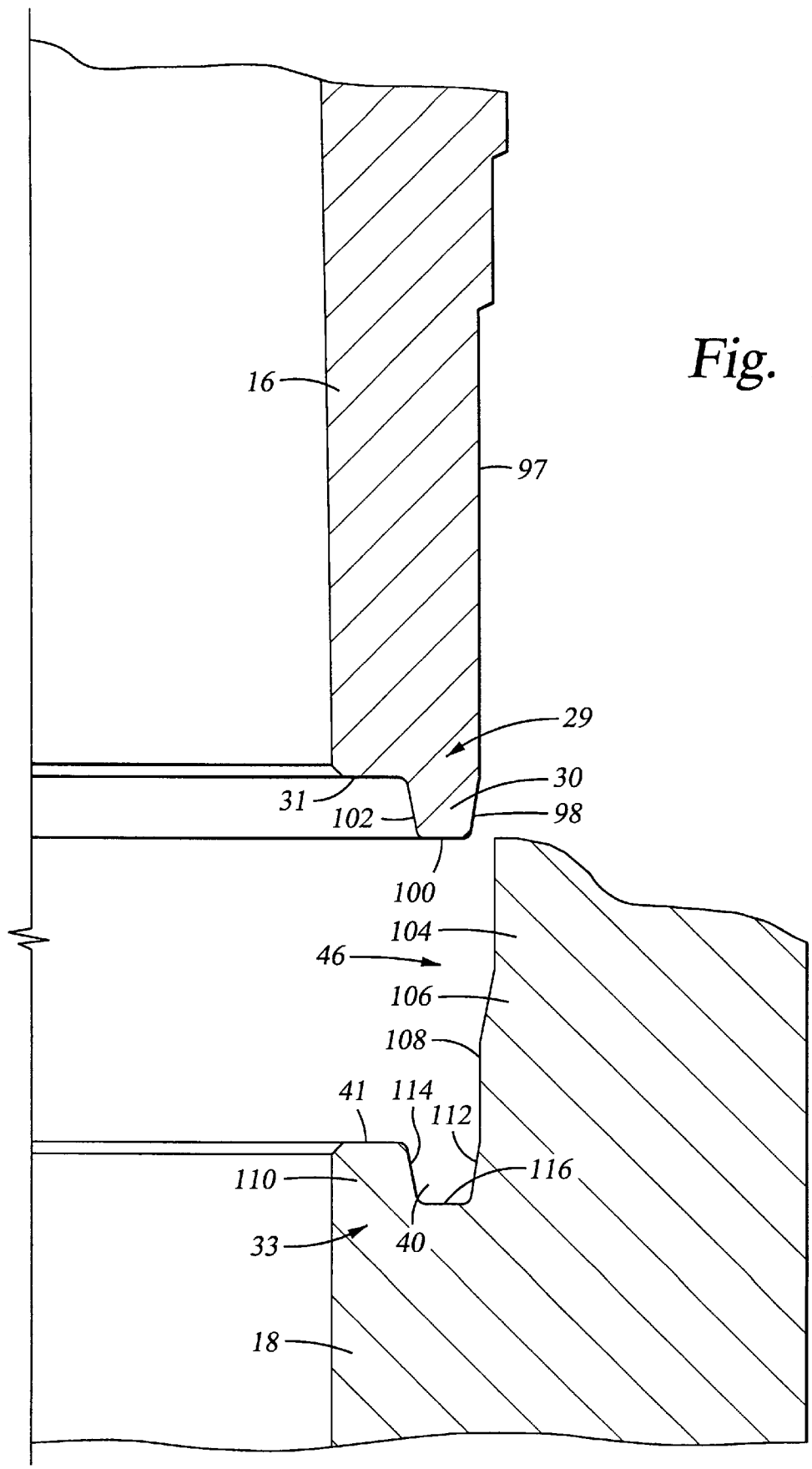
FIG. 2 is a cross sectional view of the sealing system shown in FIG. 1 prior to assembly.

Provisional application Serial No. 60/055,325, filed Aug. 11, 1997 and entitled Self-Regulating, Torque-Resistant Threaded Connection and provisional application Serial No. 60/074,358, filed Feb. 10, 1998 and entitled Threaded Connection are both incorporated herein by reference in their entirety. For nomenclature purposes, ISO CD 13679 Annex B is incorporated herein by reference.

It should be appreciated that the threaded tubular connection of the present invention may be used in an integral joint or in a coupled joint for tubular members. In an integral joint the pin and box members are joined integrally to the ends of the tubular members. In a coupled joint, a threaded coupling joins the threaded ends of the tubular members.

The threaded tubular connection of the present invention is applicable to all types of oil field tubulars including drill pipe, casing and tubing. The connection may be used on plain end pipe, cold formed swedged ends or hot forged upset ends. The tubular connection of the present invention is typically included in the broad group identified as slim-line, high performance connections. It may be used in various embodiments such as integral flush-joint, with or without crimped sections; integral swaged with or without swaged sections; hot-forged upset, one or both members; or coupled with or without crimped pin ends.

The connection of the present invention has the advantage that its tubular walls in the area of the joint are ultra slim. The connection can have the same inside diameter as the body of the tubular member, preferably an inside diameter slightly smaller than the pipe body inside diameter but sufficiently larger than the drift diameter of the pipe body to allow the free passage of downhole tools, and an outside diameter which is preferably the same as or no more than 0.22 inches greater that the outside diameter of the tubular member. Thus, the inside diameter of the connection is essentially flush with the tubular member and the outside diameter is preferably only ²⁄₁₀ths of an inch greater than the outside diameter of the tubular member.

Referring initially to FIG. 1, the threaded integral flush tubular connection 10 of the present invention includes tapered threads for connecting oil-country tubular members 12, 14. The connection 10 includes at least two mating members, a pin member 16 disposed on the body 24 of tubular member 12 and a box member 18 disposed on the body 42 of tubular member 14. The external surface of pin member 16 and the internal surface of box member 18 are generally conical in shape to assist in self-centering the pin member 16 within the box member 18 during make up. The pin member 16 is shown fully made up with the accommodating box member 18. It should be appreciated that tubular member 12 has a box member on its other end and tubular member 14 has a pin member on its other end. The pin member of a connection is understood to mean the male portion of a tubular member which is threaded on its external surface and the box member of a connection is the female portion of a tubular member which is threaded on its internal surface whereby the threads of the pin member and box member members interengage to provide a connection.

The threaded tubular connection 10 of the present invention includes thread sets with a constant taper, though not necessarily of the same magnitude, on the pin and box members 16, 18. The threads have a constant pitch and a constant lead. The thread profile is essentially the same for the pin member 16 and the box member 18. One advantage of a constant lead thread is that the thread can be machined with a single form tool with multiple passes of that tool, thereby producing load and stab flanks with the same lead, i.e. helix angle.

The thread set on pin member 16 preferably includes a section of run-out threads 20 extending from annular shoulder 22, at the pin base 23 adjacent the body 24 of member 12, to a section of full height threads 26 at the mid section 25 of the pin member 16 and a section of run-in threads 28 extending from full height threads 26 to the terminal end or pin nose 29 of pin member 16. A section of run-in threads is understood to mean a portion of threads having their roots machined parallel to the longitudinal axis of the tubular member, but having their crests machined on a taper with respect to the longitudinal axis of the tubular member; from an initial plane, the construction helix of the crests and roots of the threads diverge, ultimately achieving a full height thread. A section of run-out threads is understood to mean a portion of threads having their roots machined on a taper with respect to the longitudinal axis of the tubular member, but having their crests machined parallel to the longitudinal axis of the tubular member; gradually the construction (machining) helix of the crests and roots of the threads intersect and the thread disappears.

The thread set on box member 18 includes a section of run-in threads 32 extending from the box entry end or nose 34 to a section of full height threads 36 in the mid section 35 of the box member 18 and a section of run-out threads 38 extending from full height threads 36 to a seal groove 40 and annular shoulder 41 at the box base 33 of box member 18 adjacent the body 42 of tubular member 14. The run-in threads 28, the full height threads 26, and the run-out threads 20 on pin member 16 mate with the run-out threads 38, the full height threads 36, and the run-in threads 32 on box member 18. The shorter height run-in threads 28 adjacent the pin nose 29 substantially reduces thread flank contact in that area. The force transfer between the pin and box members 16, 18 is smoother because of the run-in/run out threads. See U.S. Pat. Nos. 5,413,442 and 5,462,315, both incorporated herein by reference. In an assembled tubular connection, the section of run-in threads on a pin member or box member typically corresponds with a section of run-out threads on the corresponding box member or pin member, respectively. Also for maximum benefit, full run-in/run-out thread sets are preferred. Those skilled in the art will also recognize with full run-in/run-out thread sets, the height of the thread, critical for connection performance at high elastic and low plastic strains, is no longer a factor affecting connection load capacity efficiencies.

For purposes of illustration and not by way of limitation, connection 10 is shown as a flush joint. Though not an industry standard practice for this invention, it is preferable to crimp the end of the pin member 16 and the outside diameter of the box member 18 in the area where the seal 46 is to be machined. To control the thicknesses in this critical area of the connection, both the box member 18 and pin member 16 are swaged down and made round so that they can be bored to the same size on their internal diameter. This provides a stepless internal profile critical for running tools inside the pipe and a uniform wall thickness essential for cyclic connection performance.

The pin member 16 includes a relatively thin section or portion 17a extending from the pin nose 29 to the mid section 25 and a relatively thick portion 17b extending from the mid section 25 to the pin base 22. The box member 18 includes a relatively thin portion 19a extending from the box nose 34 to the mid section 35 and a relatively thick portion 19b extending from the mid section 35 to the box base 33. Thin pin portion 17a generally corresponds with thick box portion 19b and thick pin portion 17b generally corresponds with thin box portion 19a.

The thickness of the pin and box members 16, 18 is controlled. The thin pin portion 17a provides a relatively flexible cylindrical member at the pin nose 29. The thin pin portion 17a between the threads and the pin nose 29 and box base 33 allows flexibility at the pin nose 29 thereby allowing a radial increase in thin portion 17a of the pin nose 29 when placed in compression.

Because the wall thickness fonned by the pin and box members is thin, the connection 10 responds to the application of torque. During power tight make-up, after the pin nose 29 has seated in the corresponding box base 33, as shown in FIG. 1D, the box member 18 shrinks radially and the pin member 16 expands radially. Likewise, the nose 29 of pin member 16 shrinks axially while the corresponding portion of the box member 18 expands axially. This shrinkage and expansion increases the radial pressure on the threads of the connection 10 thereby increasing friction. Further, because the pin member 16 and box member 18 are conical externally and internally, respectively, the radius of the threads increase from the front to the back of the connection 10 generating a cumulative friction that is non-linear with respect to make-up torque. This nonlinear increase in friction increases the torsional resistance of the connection 10 during make-up.

Referring now to FIG. 2, there is shown the seal assembly 46. The pin nose 29 of pin member 16 includes an annular tooth-like member or tooth 30. Tooth 30 forms an outer cylindrical surface 97, an outer frustoconical surface 98, an annular shoulder 100, an inner frustoconical surface 102, and an adjacent annular shoulder 31. The box base 33 of box member 18 includes a pre-ramp cylindrical surface 104, a frustoconical ramp surface 106, a cylindrical seal surface 108, an annular groove 40 and an adjacent annular tooth-like member or tooth 110. Annular groove 40 forms an outer frustoconical surface 112, inner frustoconical surface 114, and an annular shoulder or undercut surface 116. Tooth 110 includes an inner frustoconical surface 114 and an annular shoulder 41. Tooth 30 of pin member 16 is received within groove 40 of box member 18 and annular shoulder 31 on pin member 16 engages annular shoulder 41 on box member 18 to form a primary inside torque shoulder 43 and a locked, metal-to-metal seal 46. As shown in FIG. 1, the annular nose 34 of box member 18 engages annular shoulder 22 of pin member 16 to form a secondary outside torque shoulder 44.

The seal system 46 forms a two-stage, tooth-and-groove shoulder seal at the pin nose 29 and box base 33 similar to that described in U.S. patent application Ser. No. 08/895,018, filed Jul. 16, 1997, incorporated herein by reference.

The sealing system 46 of the present invention utilizes the interference between sealing surfaces to achieve a metal-to-metal sealing engagement. This is primarily a function of the relative fit between the sealing surfaces of pin cylinder 97 and box cylinder 108 and between box frustoconical surface 112 and pin frustoconical surface 98. Box ramp surface 106 engages pin cylindrical surface 97 and guides pin tooth 30 into box groove 40. Tooth 30 is forced into groove 40 and box tooth shoulder 41 is forced into engagement with pin shoulder 31 by make-up torque to achieve a relatively constant interference.

Upon make-up, pin frustoconical surface 98 engages the frustoconical ramp surface 106. This initial engagement aligns and guides the pin seal cylinder 97 into box seal cylinder 108 and more particularly aligns and guides the pin tooth 30 into the box groove 40. As the assembly progresses, the pin frustoconical surface 98 rides up on box ramp surface 106. Thereafter, the cylindrical pin surface 97, extending from tooth 30, rides up on the cylindrical box surface 108 making interfering and sealing contact. Upon further tightening of the assembled connection, the pin tooth 30 is filled and interferingly forced into box groove 40 whereby the frustoconical surfaces 98, 112 interferingly and sealingly engage. Upon final power tightening, the pin shoulder 100 engages box undercut surface 116 and box shoulder 41 engages pin shoulder 31.

Figure 3:
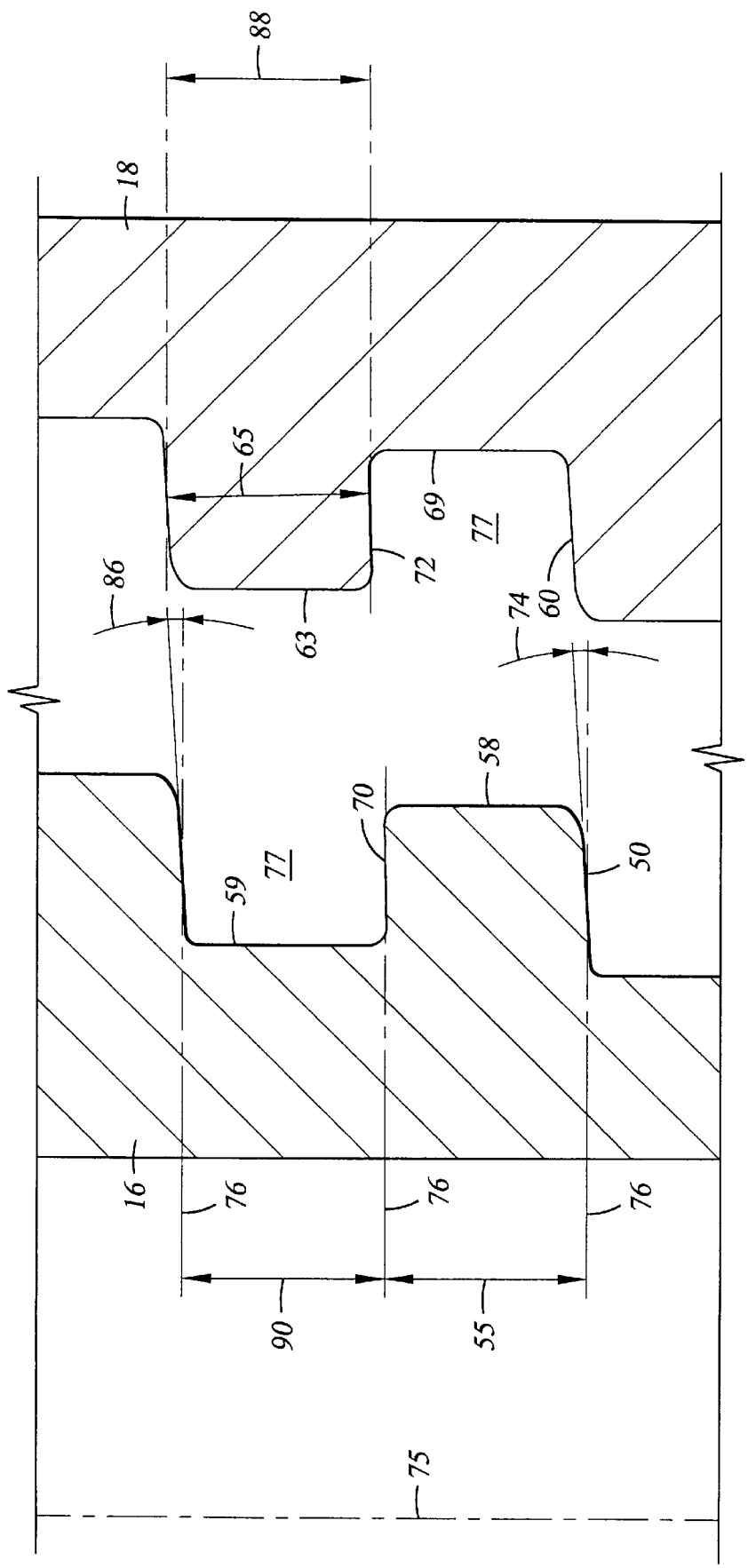
FIG. 3 is an exploded, partial cross-section view of the threads of the connection shown in FIG. 2.

Referring now to FIG. 3, the pin and box threads are shown separated for purposes of description. A stab flank is "positive", when the thread angles away from the adjacent thread groove. The load flank, though generally angled with respect to the axis in the same direction as the stab flank, is "negative", when the thread angles over the adjacent thread groove. A thread flank angle is understood to mean the angle formed between the thread flank and a line which is perpendicular to the longitudinal axis of the connection.

The pin threads on the pin member 16 have stab and load flanks 50, 70, respectively, which wind around the cone shaped pin member 16 in a helix starting from the end of the thread closest to the nose 29 of the pin member 16 and, comparably, a box threads on the box member 18 with stab and load flanks 60, 72, respectively, which wind around in a helix starting from the end of the thread closest to the nose 34 of the box member 18. A thread stab flank is understood to mean the more forward or leading flank of the thread when the pin member is telescoped into the box member and the thread load flank is understood to mean the trailing flank of a thread upon telescoping the pin member into the box member. Each thread on the pin member 16 and box member 18 has a crest 58, 68, respectively, and a root 59, 69, respectively. For purposes of description, the front of the connection 10 is defined as the pin nose 29 and box base 33 with the connection 10 extending back to the rear of the connection 10 at the box nose 34 and pin base 23.

It can be seen that the threads on the pin member 16 and box member 18 are preferably square threads or near square threads. This thread design is used on each of the threads of the connection 10 with the exception of the imperfect threads of the reduced height, run-in and run-out threads adjacent the ends of the connection. These threads are only partially machined by the thread insert, due to the intersection of cylindrical and frustoconical sections, hence, have only partially formed threads.

The cross-section or profile of the threads preferably forms a parallelogram which is square or nearly square. The thread profile may be a true square thread with zero stab and load flank angles or be a nearly square thread which has a profile of a rhomboid. Where the thread profile is rhomboid, the load flanks have a negative flank angle and the stab flanks have a positive load flank angle or the reverse where the load flanks have a positive flank angle and the stab flanks have a negative flank angle. The thread profile may also be a trapezoid where, within limits, the thread crest is slightly larger than the thread root and the flank angles are both negative flank angles. Although the present invention will allow a slightly larger crest than root, to machine such a thread profile first requires the cutting of one flank with one form tool and then cutting the other flank with another form tool.

To increase the compression efficiency of the connection 10, the thread profile is preferably a rhomboid with the stab flanks 50, 70 having a negative flank angle and the load flanks 70, 72 having a positive flank angle. To increase the tensile efficiency of the connection 10, the thread profile may be the reverse with the stab flanks having a positive flank angle and the load flanks having a negative flank angle.

In a conventional connection, the width of the thread must be smaller than the width of the accommodating groove to provide adequate clearance for the thread to stab into the groove, i.e. root opening. This clearance allows the thread to initiate its movement into the groove after the pin member has been stabbed into the box member and one member has been rotated relative to the other member. Clearance in a near square thread is the difference between the width of the crest and the width of the root opening. The required clearance varies with the size of the connection. A clearance of at least 0.004 of an inch is required just because of minimum tolerance variation in thread width and lead. Preferably, for the thread to be stabbed into the groove, the clearance between the thread and groove is between 0.002 and 0.003 per inch of outside diameter. Once the thread has entered or been stabbed into the groove, less clearance is required for the thread to continue its travel down into the groove toward the root. This travel clearance is preferably at least 0.002 of an inch.

The stab flanks 50, 60 preferably have a greater angle to the axis 75 of the connection 10, or less radial, then the load flanks 70, 72. The angling on the flanks is such that the load flanks 70, 72 are more nearly radial to the axis of the connection 10 then are the stab flanks 50, 60 to provide a crest width 88 that is slightly smaller than the root width 90. Thus as a practical matter, the absolute value of the stab flank angle will always be greater than or equal to the absolute value of the load flank angle.

The stab flanks 50, 60 have a small positive flank angle 74, preferably between 0° and 7.5°, with the perpendicular 76 from the central axis 75 of tubular members 12, 14. The load flanks 70, 72 have a small negative flank angle 86, preferably between 0° and 6.5°, with the perpendicular 76. The included angle is less than 12 degrees and preferably 3° or less. More preferably, the stab flanks 50, 60 have a flank angle of 3° and the load flanks 70, 72 have a flank angle of 20 forming an included angle of 1°. This is true for both the pin member 16 and the box member 18. The included angle can also be negative where the root width, i.e. the non-radius, non-chamfer root width, is slightly smaller than the thread crest. The amount of the negative angle is very slight.

Figure 7:
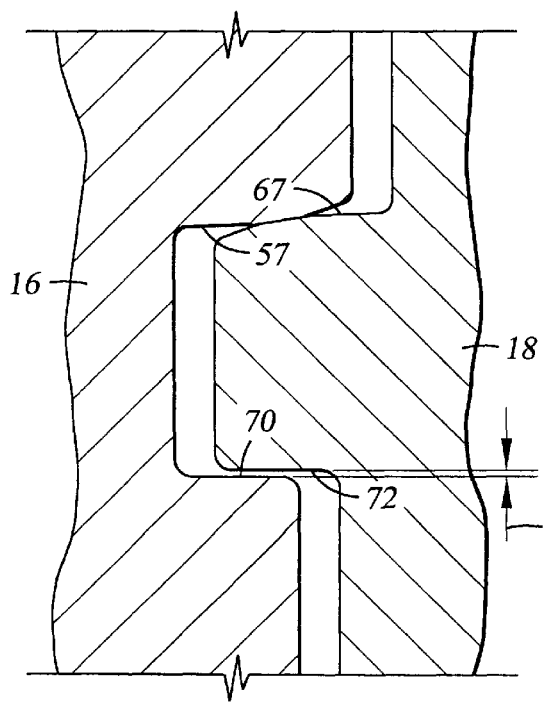
FIG. 7 is a cross section view of the threads of FIG. 1 in the camming make up position.

Referring now to FIGS. 3 and 7, the thread crests 58, 68 have a cross-sectional width 88 which is smaller than the cross-sectional width 90 of the thread roots 59, 69. Width 88 is measured between regular stab flank 67 and load flank 72 and width 90 is measured between regular stab flank 57 and load flank 70. The width 88 of the crests 58, 68 is approximately 0.002 inches less than the width 90 of the roots 59, 69 to provide travel clearance between the threads and the grooves.

As previously discussed, square and nearly square threads cannot stab into grooves with a clearance of less than 0.010 inches. Thus, although 0.002 inches is adequate travel clearance, it is not enough to stab the threads into the grooves.

The connection 10 of the present invention is provided with guide surfaces on the stab flanks 50, 60 of the threads to move the thread to the opening of the groove and to then cam the thread into the groove. The guide surfaces on the stab flanks are multiple chamfers or tapers having different flank angles. It is these multiple tapers that allow the square or nearly square threads to be inserted or stabbed into the square or nearly square thread grooves for subsequently camming the threads into the accommodating grooves. The guide surfaces preferably include a two taper stab flank or a three taper stab flank.

Figure 4A:
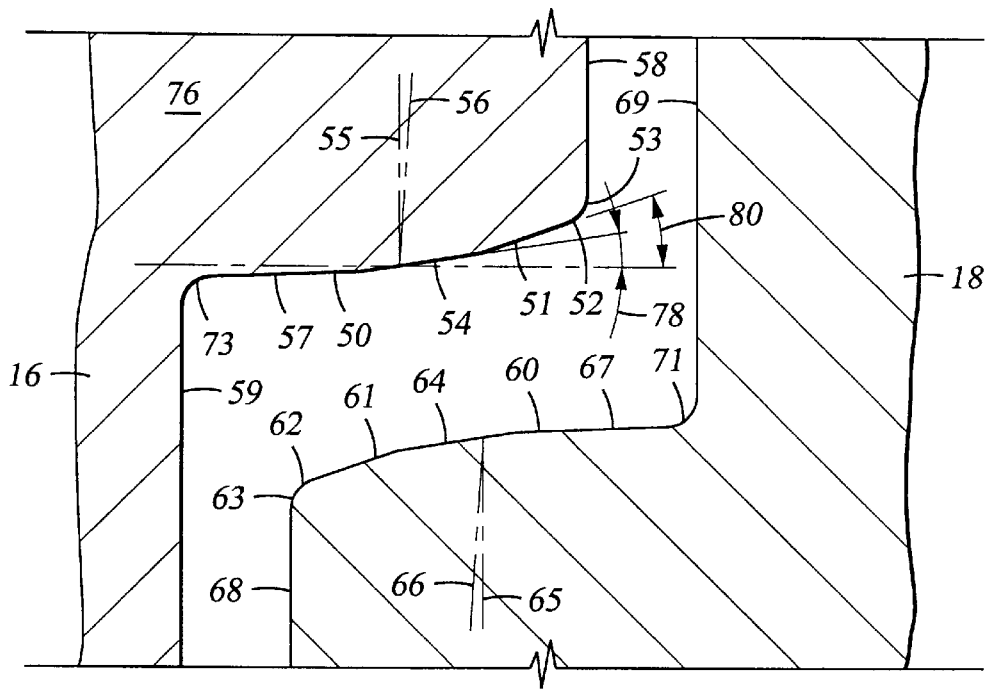
FIG. 4A is an exploded, partial cross-section view of the stab flanks of the connection of FIG. 1 having an increased thread width at the thread pitch line.
Figure 4B:
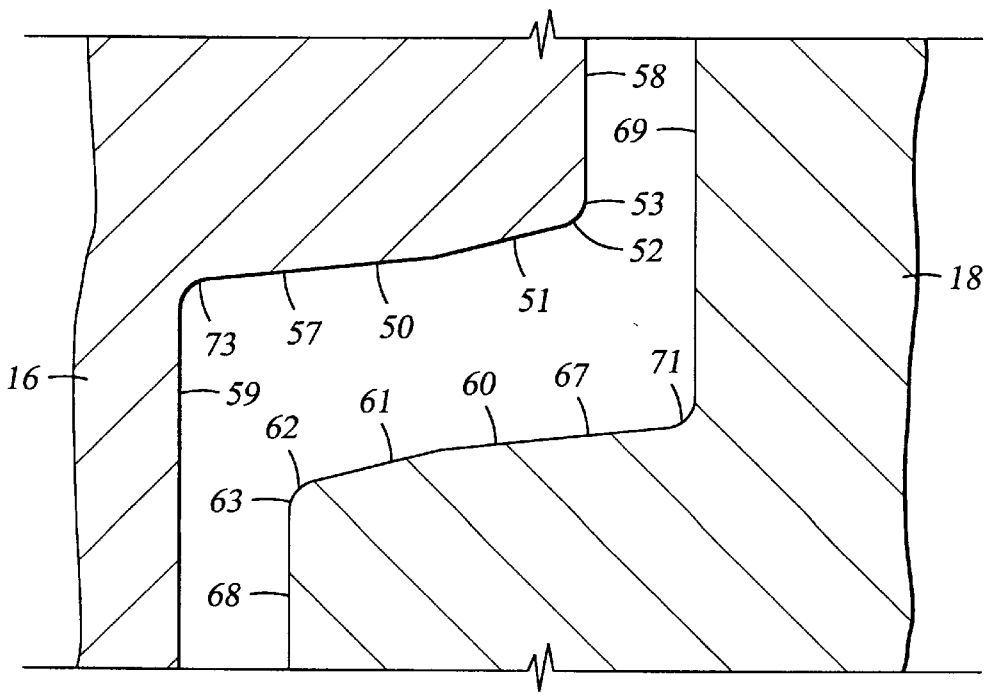
FIG. 4B is an exploded, partial cross-section view of another embodiment of the stab flanks of the connection of FIG. 1 having a generally flat surface.

Referring now to FIGS. 4A and 4B, the present invention includes two embodiments of the stab flanks 50, 60. The stab flanks 50, 60 may have three tapers as shown in FIG. 4A or two tapers as shown in FIG. 4B. In each embodiment, the stab flanks 50 on pin member 16 have a corner chamfer 52 and the stab flanks 60 of box member 18 have a corner chamfer 62.

Figure 5B:
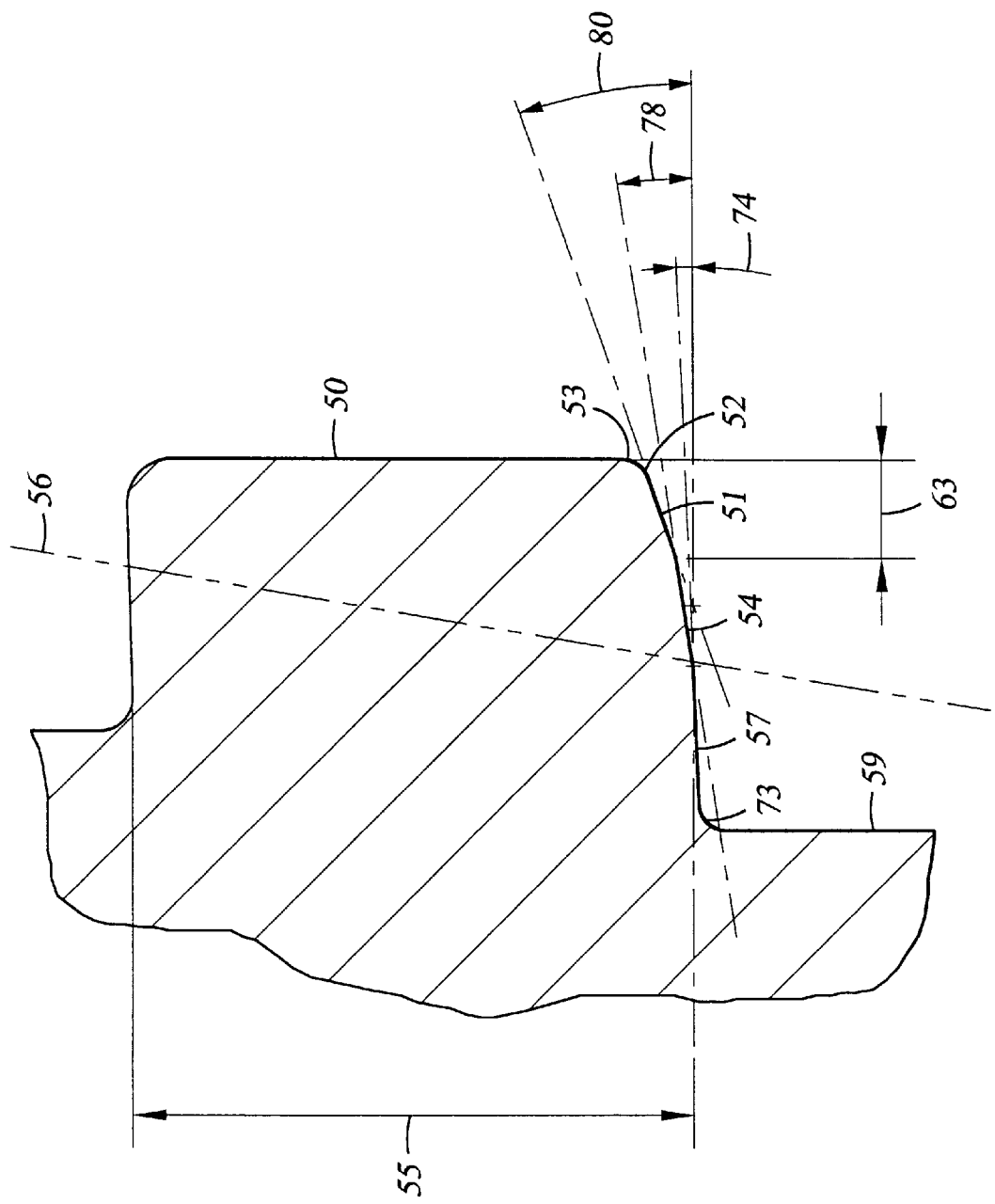
FIG. 5B is an enlarged cross sectional view of a thread of FIG. 5A.
Figure 5A:
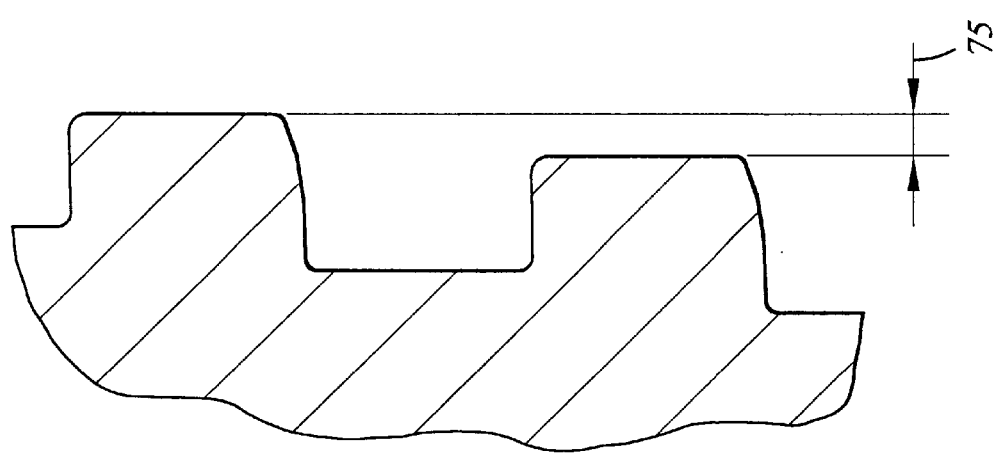
FIG. 5A is a cross sectional view of adjacent threads on the pin member of the connection of FIG.

Referring particularly now to FIGS. 4A, 5A and 5B, the stab flanks 50, 60 include three tapers, namely corner chamfers 52, 62, cam flanks 54, 64, and regular stab flanks 57, 67. The three tapers form the guide surfaces on the stab flanks 50, 60.

As best shown in FIGS. 5A and 5B, there is shown an enlarged stab flank 50 on pin member 16 which is also illustrative of stab flank 60 on box member 18. Corner chamfer 52 includes a flat 51 and a corner radius 53. Radius 53 extends from crest 58 to flat 51. Flat 51 extends from radius 53 and intersects with cam flank 54. A chamfer is a controlled flat and radius which allows the crest to slide into the root with very little clearance.

Each of the corner chamfers 52, 62 has a radial height 63 at least as great as the step height 75 of the thread. The height 63 of each corner chamfer 52, 62 needs to be no greater than the step height 75 of adjacent thread. The step height 75 of the thread is a function of the pitch and taper of the thread. There is no practical reason to extend the corner chamfers 52, 62 past the pitch lines 56, 66 since beyond that point, the thread crests 58, 68 will contact the roots 59, 69 to prevent flirter camming action of the threads.

Figure 6:
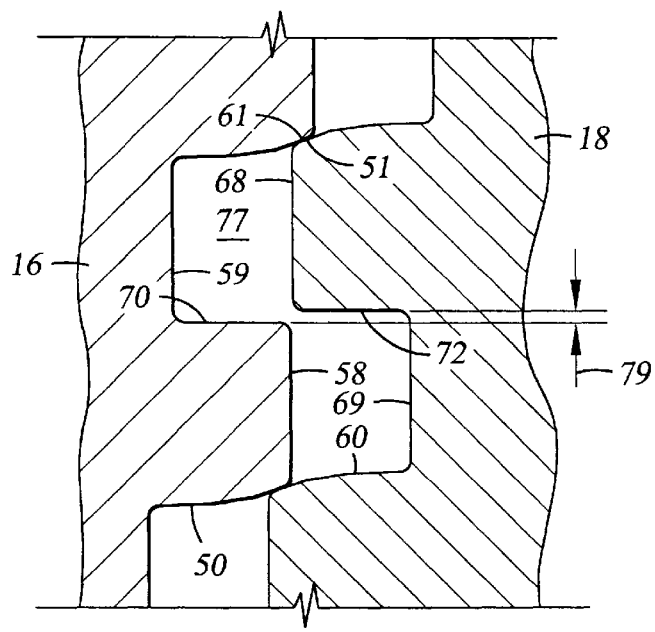
FIG. 6 is a cross-section view of the threads of FIG. 1 in the stab position.

Referring now to FIG. 6, the flats 51, 61 on the corner chamfer 52, 62 respectively cause the threads to shift forward in the connection 10 by the amount of the chamfer to provide added clearance in the stab position to allow the insertion of the thread into the accommodating groove. In the stabbing position, the mating corner chamfers 52, 62 provide a clearance 79 of at least 0.010 of an inch and preferably a clearance 79 of approximately 0.020 of an inch. The angle of the flats 51, 61 of the corner chamfers 52, 62 determines the clearance 79 between the thread and groove so as to permit the thread to stab into the groove. To provide an adequate clearance 79 between the thread width and root opening, the preferable rise over run of the flats 51, 61 of the corner chamfers 52, 62 is 3 to 1 (18.50). The rise over run is preferably in the range of 2 to 1 (26.5°) to 4 to 1 (14°) with the preference being 3 to 1. The radiuses 53, 63 at the end of the flats 51, 61 permit a less steep taper.

Referring now to FIG. 4B, the stab flanks 50, 60 have two tapers. Stab flank 50 of pin member 16 includes a corner chamfer 52 with a radius 53 extending from thread crest 58 to flat 51 with flat 51 intersecting with regular stab flank 57 which extends to corner radius 73 at the root 59. The stab flank 60 of box member 18 includes a corner chamfer 62 with a radius 63 extending from thread crest 68 to flat 61 with flat 61 intersecting with regular stab flank 67 which extends to corner radius 71 at the root 69. The regular stab flank is the original stab flank with the original stab flank angle and is a straight, flat surface extending to the root.

The flats 51 and radiuses 53 on the chamfers 52, 62 allow the crests 58, 68 to translate into the openings 77 of the roots 59, 69 without binding as a result of any miss-alignment, eccentricities or other deviation of actual pipe from (theoretic) perfect cylinders. As the connection is made up, the threads move into the accommodating grooves because as one member is rotated with respect to the other, the diameter of the pin threads becomes larger and the diameter of the box threads smaller (as a function of the taper of the respective cones) causing the crests 58, 68 to move toward and into the openings 77 of the roots 59, 69.

The chamfers 52, 62 preferably also have a "positive" angle to help self-center the advancing pin member 16 into the box member 18 without unnecessarily engaging the edges of the threads. The corner chamfers 52, 62 of the present invention not only form a self-centering effect per U.S. Pat No. 5,462,315 but also when properly dimensioned provides clearance which allows the load flank of one member to pass the load flank of the other member in the stab position; hence, allowing the threads to engage upon rotation make-up. The crest to crest engagement, a problem with square tapered threads, which causes the connection make-up to foul, is prevented. The thread stab flank chamfers 52, 62 on the full height threads allows several of the threads on the pin member 16 and box member 18 to be in engagement alignment prior to rotational assembly. Desirably, at least half of the threads are so engaged.

Figure 8:
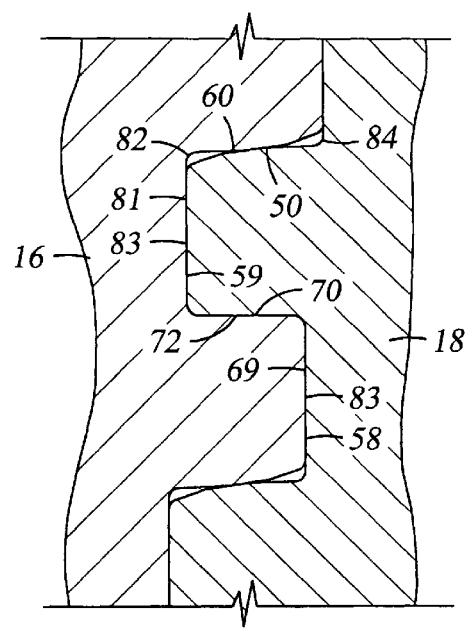
FIG. 8 is a cross-section view of the threads of FIG. 1 in the made-up position with the thread Profile of FIG. 4A.

Referring now to FIG. 8, the crests 58, 68 and roots 59, 69 have a mild radial interference at 81, 83, preferably about 0.0010 to 0.0015 inches per inch of connection diameter. Interference between the thread crests 58, 68 and roots 59, 69 maintains the pin and box members 16, 18 in a cylindrical or round configuration. The range of interference is 0.003 to 0.010 of an inch which is 0.0005 per inch pipe diameter to 0.0015 per inch of pipe diameter. This interference amounts to about 25 to 33% of the yield strength of the material of the pipe. The thread crest is understood to mean the thread location at which the wall of the tubular member has been machined to its miminum depth and defines the major diameter of a pin thread and the minor diameter of a box thread and the thread root is understood to mean the thread location at which the wall of the tubular member has been machined to its maximum depth and defines the major diameter of the box thread and the minor diameter of the pin thread.

There is a clearance of a nominal 0.002 of an inch between widths 88 and 90 to allow the thread to continue its travel into the groove 77. The range of clearances between the thread and groove is 0.001 to 0.004 of an inch. A 0.002 inch clearance between the thread and groove will not permit the stabbing of the thread into the groove. The corner chamfers 52, 62 are required to increase that clearance to permit stabbing. A 0.002 of an inch difference in the widths 88, 90 provides a ratio of 0.99 of the thread width to root opening. The ratio of thread width to root width preferably is 0.95 or greater. The preferred range is 0.98 to 1.0 and most preferably is 0.99.

Referring now to FIGS. 4A and 5B, the embodiment of FIG. 4A has stab flanks 50, 60 which have an increased thread width 55, 65 at the thread pitch lines 56, 66. The pitch line thread width 55 of the stab flank 50 of pin member 16 forms a cam flank 54 which extends from the comer chamfer 52 to the pitch line 56 of the pin thread and a regular stab flank 57 which extends from the pitch line 56 to the comer radius 73 of the root 59. Likewise the increased thread thickness 65 of the stab flank 60 of box member 18 includes a cam flank 64 which extends from the comer chamfer 62 to the pitch line 66 of the box thread and a regular stab flank 67 which extends from the pitch line 66 to the corner radius 71 of root 69. As best shown in FIG. 5B, the angle 74 of regular stab flanks 57, 67 is 2°, the angle 78 of cam flanks 54, 64 is 9.46°, and the angle 80 of comer flats 51, 61 is 18°, i.e. 3 to 1. These are the approximate preferred embodiments for these angles.

As shown in FIG. 4A, cam flanks 54, 64 adjacent the crests 58, 68, respectively, form a chamfer angle 78 with the perpendicular 76. Comer chamfers 52, 62 form a chamfer angle 80 with the cam flank 54, 64. These angles cause clearances 82, 84, shown in FIG. 3, to be formed between the threads upon make-up.

The threads may have no clearance, a slight clearance or a positive interference at the thread pitch lines 56, 66 due to increased thread widths 55, 65. The increased thread widths 55, 65 at the thread pitch lines 56, 66 of the stab flanks 50, 60 respectively is preferably the same as the nominal clearance between the load flanks, i.e. 0.002 of an inch. The thread width 55, 65 at the thread pitch line 56, 66 is preferably equal to the width of the root opening at the pitch line. After the load flanks 70, 72 contact, the cam flanks 54, 64 cam the load flanks 70, 72 together as the thread is stabbed further into the groove thereby closing the clearance at the load flanks 70, 72 to zero plus or minus tolerances i.e. between zero and 0.001 of an inch. By adding cam chamfers 54, 64 that extend from the end of the flats 51, 61 to the thread pitch lines 56, 66, there is actually a zero clearance between the threads and grooves upon mating. Because of this camnming action, it is possible to have a interference fit between the threads, i.e. the thread width could actually be slightly larger than the groove at the thread pitch line. Since a clearance is artificially induced between the load flanks 70, 72 as the thread is stabbed into the groove, the guide surfaces can cam a thread into the groove where the thread is larger than the groove at the thread pitch line 56, 66. As the thread moves downward into the groove, the artificially induced clearance 79 closes up and ultimately causes an interference between the threads. Positive interference at the pitch line 56, 66 requires an increased torque to close the threads but achieves no movement between the thread flanks when the connection is placed in compression.

Figure 8A:
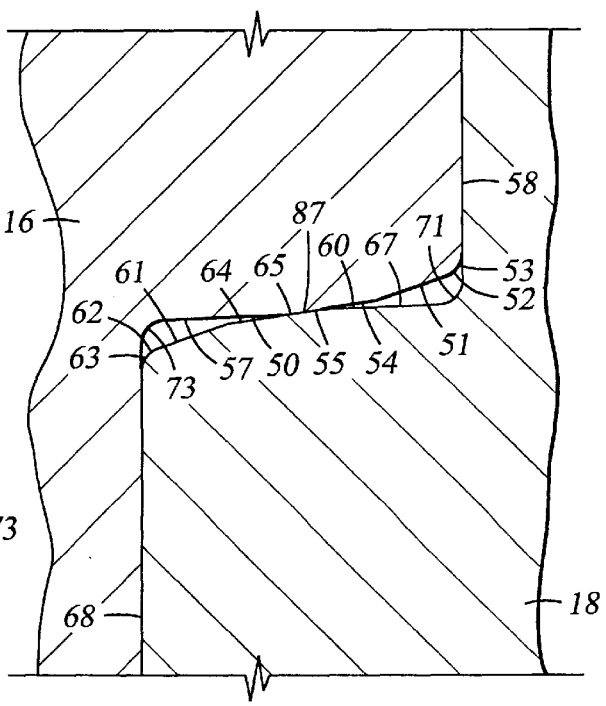
FIG. 8A is an enlarged detail view of the stab flanks of the connection shown in FIG. 8 in engagement.

As shown in FIG. 8A, the increased thread width 55, 65 may form a helical line contact or have a width to form a band or ribbon contact at 87. A ribbon contact may occur naturally at the pitch lines 56, 66 due to Poison's effect when additional torque is applied in final make-up.

Although the maximum dimension of thread widths 55, 65 is preferably located at the thread pitch line 56, 66, it may be located between the thread pitch lines 56, 66 and the thread crests 58, 68, ie. slightly radially outward of the thread pitch lines 56, 66. This insures a band or ribbon contact between the stab flanks 50, 60 at the thread pitch lines 56, 66. Selectively locating the thread widths 55, 65 also allows the regulation of the extent of the engagement at 87 between the stab flanks 50, 60.

As shown in FIG. 6 with the connection 10 in the initial stab position, the comer chamfers 52, 62 allow an initial clearance 79 of 0.020 inches between the load flanks 70, 72. With the comer chamfers 52, 62 as shown in FIG. 4A in initial engagement to properly align the crests 58, 68 with the roots 59, 69, this 0.020 inch clearance is sufficient to allow the threads to move into the grooves as they are rotationally assembled. Further, as shown in FIG. 7, the cam flanks 54, 64 of FIG. 4A guide the travel of the threads within the accommodating grooves 77. These flanks provide a camming action to cam the thread into the groove. The camming action is a forced multiplier due to the taper on the threads. The corner chamfers 52, 62 and cam flanks 54, 64 allow the crests 58, 68 to be slipped into the grooves 77 of the roots 59, 69 in a very tight fashion such that very little clearance 73 is required between the load flanks 70, 72. As shown in FIG. 7, in the make-up position, the 0.020 of an inch clearance 79 after insertion is then closed up to the travel clearance 73 of 0.002 inches. Thus, a tight fit is achieved within the thread profiles while the threads on the pin and box members 16, 18 are still received in the accommodating grooves in the corresponding box or pin member without binding which occurs in prior art connections with near square thread profiles.

Referring now to FIGS. 8 and 8A, there is shown the stab flanks 50, 60 in the final made-up position. The preferred flank angles, and the proper dimensioning of thread width and grooves, also cause the thread widths 55, 65 of the preferred stab flanks 50, 60 to engage in line or narrow ribbon contact at their pitch lines 56, 66 thereby forming a helical line or narrow ribbon contact at 87 between the stab flanks 50, 60 in the made-up position. The threads must be dimensioned properly for line or narrow ribbon contact at 87 as well as have the chamfers 52, 62. This helical line or narrow ribbon contact at 87 results in a line or narrow ribbon torque shoulder extending the entire thread helix which absorbs torque. After the load flanks 70, 72 engage, the cam flanks 54, 64 cam the increased thread widths 55, 65 together allowing the clearance 89 shown in FIG. 13 between the stab flanks 50, 60 to be closed up to zero, and even slightly interfering, less than zero clearance.

Figure 9:
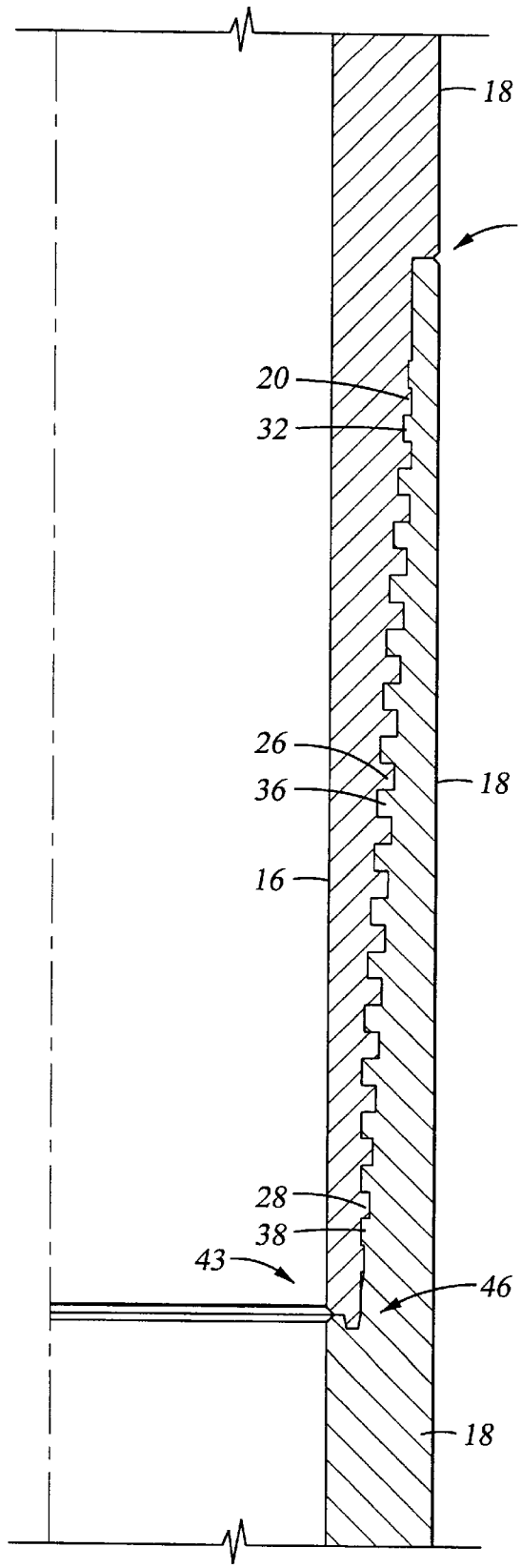
FIG. 9 is a cross-section of a flush-type, high torque connection utilizing the present invention.
Figure 10:
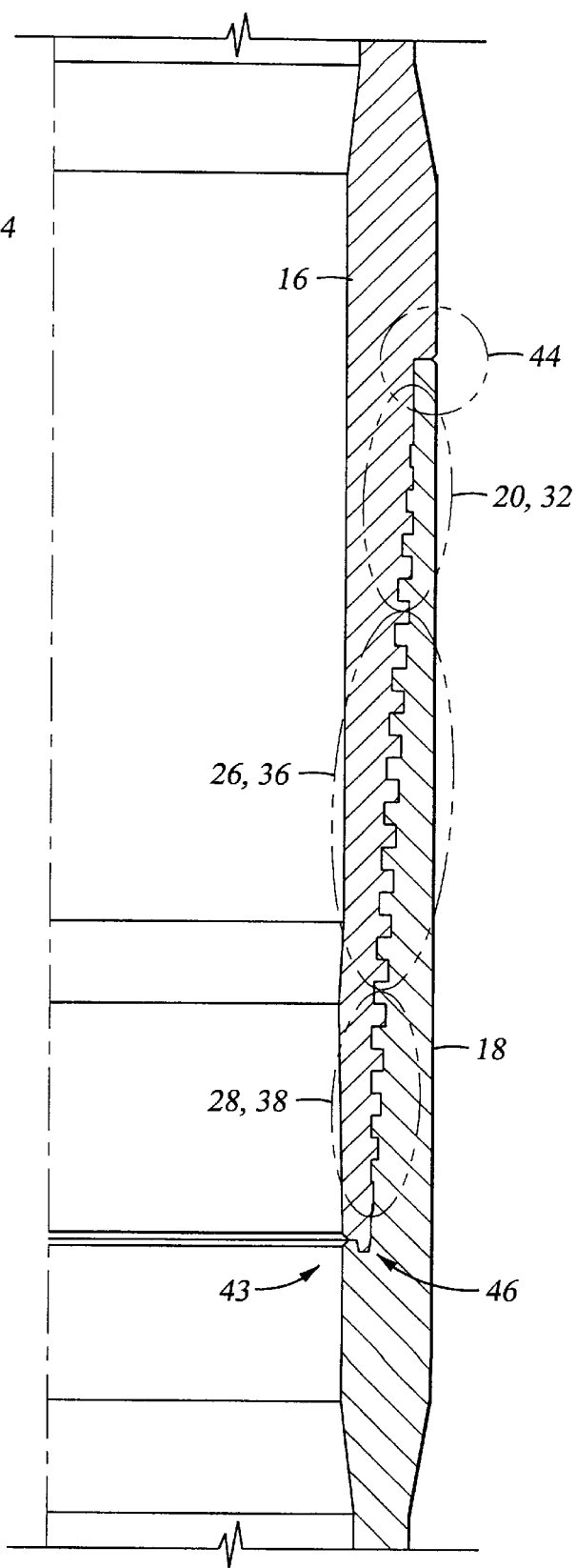
FIG. 10 is a cross-section of a hot-forged, slim-line, high torque connection utilizing the present invention.

Referring now to FIGS. 9 and 10, there is shown in FIG. 9 a flush-type, high torque connection with the secondary torque shoulder 44, the run-in/run-out threads 20, 32, full height, diametrically interfering threads 26, 36, run-out/run-in threads 38, 28, primary torque shoulder 43 and seal assembly 46. In FIG. 10 there is shown a hot-forged, slim-line, high torque connection with the secondary torque shoulder 44, the run-in/run-out threads 20, 32, full height, diametrically interfering threads 26, 36, run-out/run-in threads 38, 28, primary torque shoulder 43 and seal assembly 46.

Alternatively, in the case of a coupled connection (not shown), a coupling joins two pin members with two box member members. Each of the pin members that comprise the connection has a seal assembly on both ends followed by a single threaded section. Each coupling has two corresponding seal assemblies in the center with corresponding threaded sections emanating to the end of the coupling. A made-up coupling on a pipe would thus produce a pin by box threaded joint of pipe. See for example U.S. Pat. No. Re. 34,467.

Referring now to FIGS. 11 and 12, the sequential make up of the connection 10 is shown. The following is a description of the make-up of the connection 10 of the present invention.

Figures 11A, 11B, 11C, 11D:
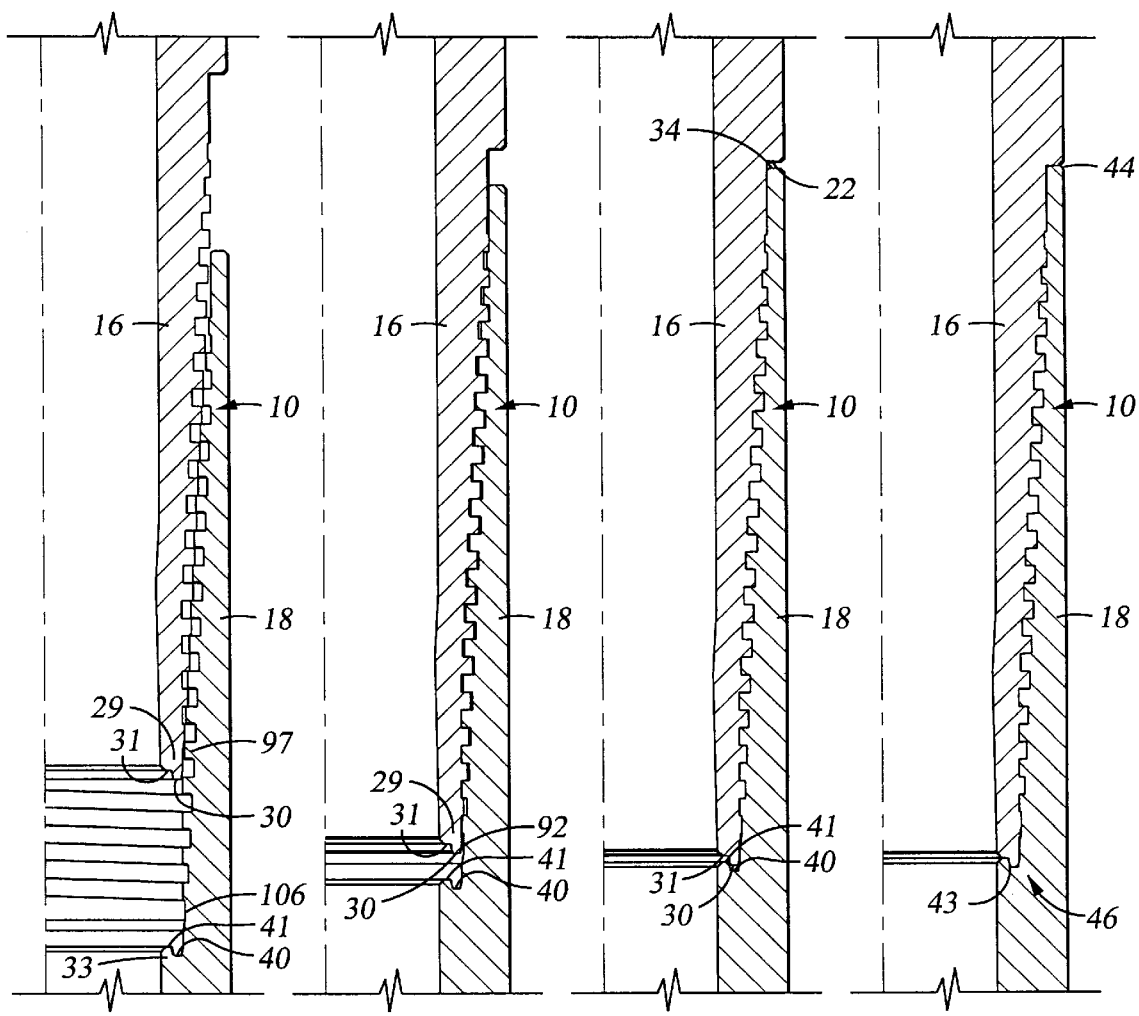
FIG. 11A is a cross-section view of the threads in the stab position.
FIG. 11B is a cross-section view of the threads of the connection in the initial assembly position as the flank chamfers engage.
FIG. 11C is a cross-section view of the threads of the connection in the setting position as the pitch points of the threads and the load flanks come closer to each other.
FIG. 11D is a cross-section view of the threads of the connection in the final make-up position.
Figures 12A, 12B, 12C, 12D:
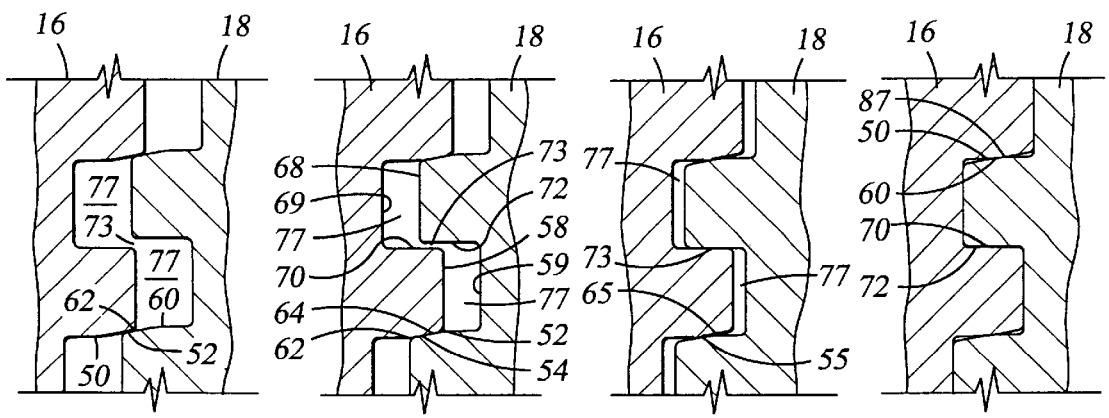
FIG. 12A is a schematic view of a cross-section of the connection in the stab position with the pin member and box member members just starting the assembly process where the stab flanks of each member are just touching.
FIG. 12B is a schematic view of a cross-section of the connection in the initial assembly position as the two seals just touch.
FIG. 12C is a schematic view of a cross-section of the connection in the setting position as the two seals engage.
FIG. 12D is a schematic view of a cross-section of the connection in the final make-up position as the seals and torque shoulders of the two members engage.

Referring now particularly to FIGS. 6, 11A and 12A, the connection 10 is shown in the stab position where the pin member 16 has been stabbed into the box member 18 to begin the assembly process. The external conical shape of the pin member 16 and the internal conical shape of the box member 18 initiates the alignment of the pin member 16 within the box member 18. The chamfers 52, 62 on stab flanks 50, 60, respectively, engage after the box member 18 has received at least half, and preferably three-quarters of the pin member 16. At this stage, the stab flanks 50, 60 are just touching. The depth of the stab can be regulated by the taper and pitch of the threads. The engagement of the chamfers 52, 62 further self-aligns the pin member 16 within the box member 18. The engagement and alignment of the corner chamfers 52, 62 shifts the pin member 16 forward within the box member 18 to provide the necessary stabbing clearance 79 shown in FIG. 6 and permit the threads on the pin and box members 16, 18 to be moved to and received in the openings of the respective accommodating grooves 77 on the corresponding box and pin members 18, 16. The primary and secondary torque shoulders 43, 44 and seal assembly 46 have not yet engaged.

After the initial contact of the chamfers 52, 62, one member is rotated with respect to the other member. During the initial revolutions or rotations of one member with respect to the other member, the threads travel toward the mouth of the root opening or groove as the threads are guided by corner chamfers 52, 62. The guidance by the corner chamfers 52, 62 stops after there have been a sufficient number of rotations whereby the thread diameter has increased a distance equal to the step height 75 between adjacent threads shown in FIG. SA. At that time, the threads enter the accommodating grooves. Once this occurs, no further action is required to stab the threads into the grooves and the stabbing clearance 79 may be reduced to travel clearance 73. Further the connection 10 is axially locked but there has not yet been any interference between the seal surfaces or between the threads. There is minimal clearance between the threads, however, at this point in the make up.

Referring to FIGS. 11B and 12B, the connection 10 is shown in the camming make-up position. Rotation at very low torque is now applied to move the threads of the pin and box members 16, 18 from the stab position to the camming position. As this torque is applied, the connection 10 moves both axially and radially together as the connection makes up. The chamfers 52, 62 have guided the cam flanks 54, 64 on stab flanks 50, 60 into engagement as shown in FIG. 12B. Thus, the crests 58, 68 have now been received by the accommodating grooves 77 of roots 59, 69. Initially only the stab flanks 50, 60 are in contact. The load flanks 70, 72 have a clearance up to the travel clearance 73 of 0.002 of an inch therebetween.

As the crests 58, 68 are cammed into the roots 59, 69, the connection 10 becomes relatively rigid and stiff soon after the connection 10 is halfway made up, in essence further self aligning and mutually centering the pin and box members 16, 18. The stabbing of a square thread into a square groove with little clearance therebetween causes the connection 10 to become tight at over three-quarters make up as shown in FIG. 11B.

As additional rotation occurs, the threads are cammed by cam flanks 54, 64 into the root openings or grooves with the threads still riding on the stab flanks until the clearance between the load flanks 70, 72 becomes the travel clearance 73. The pin member 16 rotates freely within the box member 18 because there is little or no interfering surfaces either in the threads or in the seals and shoulders. This relatively free rotation continues until the outer cylindrical surface 97 (FIG. 11A) of the pin nose 29 engages the box ramp surface 106 adjacent the box base 33. As shown in FIG. 11B, the surfaces of seal assembly 46 are beginning to engage at 92. This is the initial interference between the pin member 16 and box member 18. Power tight torque cannot be applied to the connection until there some interference.

Once the ramp interference occurs, then there is a reaction resisting the axial travel of the pin member 16 into the box member 18 which initiates the shifting of contact from the stab flanks 50, 60 to the load flanks 70, 72. As the contact is transferred from the stab flanks 50, 60 to the load flanks 70, 72, the torque begins to increase because of the contact between the seal surfaces of seal system 46 and between the load flanks 70, 72.

Referring now to FIGS. 11C and 12C, the connection 10 is shown in the initial sealing position. The application of additional make-up torque causes the pin and box members 16, 18 of the connection 10 to be further drawn together axially and radially as the threads travel in the helix of the accommodating grooves 77. This travel continues until the tooth 30 of pin member 16 begins to stab into groove 40 of box member 18. The frustoconical surfaces 102, 114 between the tooth 30 and groove 40 have not yet contacted. The cylindrical pin surface 97 is still riding up the ramp surface 108.

At this point, the thread crests 58, 68 and roots 59, 69 begin to interfere. The threads minimally interfere with the complementary mating threads until nearly filly assembled. As additional torque is placed on the connection 10, the contact areas between the crests 58, 68 and the roots 59, 69 of the threads increases. The root/crest combinations near the pin nose 29 engage first. This is regulated by the differences in taper between the pin and box members 16, 18. After the primary torque shoulders 43 are driven together, both box member root 69/pin member crest 58 and pin member root 59/box member crest 68 interferingly engage in the range of about 0.0010 to 0.0015 inches per inch of connection diameter depending on the combination of wall thickness and tolerances of the particular connection 10. The more torsion that is applied, the greater the contact areas become such that the net affect is the locking up of the threads as hereinafter described.

The pin tooth 30 then begins to stab into the box groove 40 to begin to generate larger reaction forces with the torque increasing substantially. There is some initial force transfer and stress transfer when the tooth 30 enters the box groove 40 whereby the locking process begins. Lock up means no further torsion is transmitted to that portion of the pin member 16 and that portion does not move further as make up torque is increased. As thread interference accumulates, Poisson's effect begins, although small at this point. Further, the thin portion 17a of the pin member 16 begins to be placed in compression and the thick portion 19b of box member 18 begins to be placed in tension. The walls of the pin and box members 16, 18 are thin enough such that compression of the pin thin portion 17a causes it to expand radially and the tension of the box thick portion 19b causes it to contract radially. The compression of the pin thin portion 17a and the tension of the box thick portion 19b places enough force in the threads to increase the pin member's diameter and decrease the box member's diameter (Poisson's effect). Since the pin and box members 16, 18 have thin walls, when the pin member 16 is in compression and the box member 18 is in tension, from Poisson's effect, the bearing pressure between the threads of the pin and box members 16, 18 actually increases thereby increasing the friction in and the torque resistance of the threads.

Figure 13:
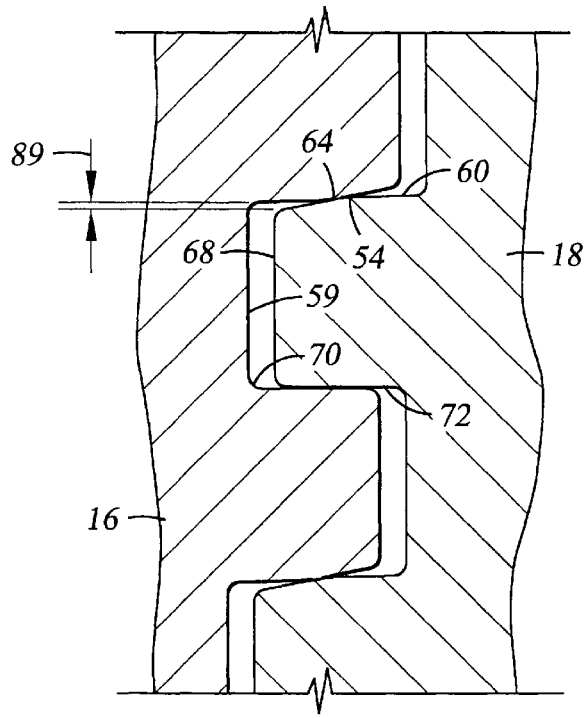
FIG. 13 is a schematic view of a cross-section of the connection prior to crest/root contact with the stab flanks being cammed together.

In the initial sealing position, the threads shift from stab-flank engagement to load-flank engagement causing clearance 89 between stab flanks 60, 60. This shift is caused by thread and seal interference developing between the pin and box members 16, 18. Thus, power tight torque must be applied to continue the rotational make-up of the members 16, 18 which in turn forces a change in flank contact from stab flanks 50, 60 to the load flanks 70, 72 of the threads. In other words, load flank contact is required to drive, ie. power torque, the interfering pin and box members 16, 18 together. As shown in FIG. 13, upon contact of the load flanks 70, 72 and further rotation, the increased thread widths 55, 65 move together on the stab flanks 50, 60 and again engage causing the cam flanks 54, 64 to cam the threads together at the pitch lines 56, 66 thereby closing the clearance 89 between the stab flanks 50, 60. As further torque is applied to the connection 10, the stab flanks 50, 60 contact at 87 and begin to come under load.

Referring now to FIGS. 8, 11D and 12D, the connection 10 is shown in the final make-up, full power tight position. Additional applied make-up torque is then required to seat the pin tooth into the box groove 40 and force the seal torque shoulders 31, 41 and shoulders 100, 116 together to complete the seal assembly 46. The seal assembly 46 is reinforced and stabilized by the interaction between the seal frustoconical surfaces 98, 112, the seal torque shoulders 31, 41 and 30, 116 and the complementary run-in/run-out mating threads 20, 32 and 38, 28 which are in close proximity.

In the final make up, the pin thin portion 17a remains in compression and the box thick portion 19b remains in tension. Once the seal assembly 46 has been fully seated, the connection 10 will not move further axially in the immediate area of the seal assembly 46. This causes the locking process to travel from the front of the connection to the back of the connection. Once the tooth 30 engages the bottom of the box groove 40, the axial movement of the pin nose is substantially stopped upon any further rotation of the pin nose 29. However, small relative axial pin to box movement may continue in the area behind the seal assembly 46 and partially in the run-in/run-out sections of the threads. Any further torque is transferred to the threads starting in the front and then extending to the back of the connection.

As the pin nose 29 bottoms out against box base 33 and further torque is placed on the connection 10, the transfer of torque and subsequent locking of the threads torsionally isolates the seal assembly 46. As the connection 10 transfers essentially all of the remainder of the applied torque to the threads, the seal assembly 46 and the primary torque shoulders 43 becomes iusulated from the applied make-up torque, and does so over a wide torque range. Thus the metal-to-metal seal assembly 46 is locked and isolated from the make up torque.

As more torque is applied to the connection 10, the additional torque moves upward and outward from the pin nose 29 and is placed on those threads extending back from the front of the connection 10. As the front threads near the pin nose 29 begin to lock up with the additional torque, the torque travels back in the connection 10 and is transmitted to those threads further back on the connection 10. This causes the threads extending back from the front of the connection 10 to sequentially lock up as additional torque is applied thereby increasingly tightening the connection 10. The thread form profile thus exhibits an increasing torsional resistance with increasing make up torque. This continues until the connection is fully locked up at power tight make-up. An increase in make-up torque resistance occurs because each subsequently locked thread has a larger diameter, thus more surface area to absorb the applied torque. In other words, the more torque that is applied to the connection, the more torque resistant the connection becomes until the elastic limit of the material is reached.

The connection power tight make-up torque is regulated so that the aforementioned thread locking occurs to the last several full height threads near the end of the box member 18. At the end of the box member 18, the secondary torque shoulder 44 is designed to be normally just barely free or barely touching at substantial over torque. Thus, the pin and box threads at the end of the box member 18, the large diameter portion of the threads, continue to maintain load flank to load flank contact, which is necessary to maintain full joint strength capabilities.

It should be appreciated that the box nose 34 of the box member 18 must not prematurely engage the pin base 23 and prevent the compression of the pin nose 29 against box base 33. If the box nose 34 shoulders out prior to the pin nose 29, then the threads will not lock up in the preferred order and prevent the application of increasing torque. In the present invention, by natural Poisson's effect, with an interference thread, the box member 18 elongates and becomes diametrically smaller and the pin member 16 becomes shorter and diametrically larger when load flank contact occurs. All the tension in the pin member 16 has dissipated at the end of the make-up of the connection. All the tension is in the box member 18. Thus, the box nose 34 and the pin base 23 should just touch. The load flank contact point is moved away from the vanishing point of the run-in/run-out threads and moved down into the connection 10 by expanding the box member 18 and shrinking the pin member 16. The criticality point is moved under tension loading from the cylinder at the run-out of the threads into the run-out threads themselves making the connection less efficient. Thus, box nose engagement is undesirable.

As the threads fully engage, the pin and box members 16, 18 engage at thread widths 55, 65 with zero clearance and the stab flanks 50, 60 close such that the stab flanks 50, 60 engage at the pitch diameters 56, 66 of the threads. This contact ideally forms a helical contact line or band at 87 which extends the entire length of the thread helix, less half the length of the run-in/run-out complementary matched pair of threads at the pin nose 29 and half the length of the run-in/run-out complementary matched pair of threads at the box nose 34. Subsequent to shouldering, as Poisson's effect causes the box member 18 to elongate and its diameter to become smaller and the pin member 16 to shorten and its diameter to increase, the contact between the thread widths 55, 65 of the stab flanks 50, 60 increases in size to a ribbon or band contact at 87, best shown in FIG. 12D. This increases the torque absorbing capacity of the threads. The relative rotational displacement between the pin and box threads is slightly greater at the end of the box member 18 than at the end of the pin member 16. Also since there is no purposeful external shouldering, the thread interference near the end of the box member 18 causes the box member 18 to expand in diameter and by Poisson's effect to axially contract thereby maintaining full load flank contact, thus progressively increasing the thread contact and resultant torque resistance.

In the fully made up position, the threads are now engaged on (a) the load flanks 70, 72 of the two threaded pin member and box member members 16, 18, (b) the crests 58, 68 and roots 59, 69 of the two threaded pin member and box member members 16, 18, and (c) at a single "band of engagement" a 87 along the length of the stab flanks 50, 60 of the two threaded pin member and box member members 16, 18. As additional torque is applied to the connection 10, the reaction between the load flanks 70, 72 and the combination of seal assembly 46, shoulders 43, 44, roots 59, 69/crests 58/68, and stab flanks 50,60 squeezes the threaded connection 10. In summary, the different positions include the initial stab position, the camming make-up position, the initial sealing position, root and crest interference, tooth and groove engagement, and then final torque make-up.

It can also be seen that the crests 58, 68, roots 59, 69, stab flanks 50, 60 and load flanks 70, 72 of the threads are in full engagement when the connection 10 is fully made up. The crests 58, 68 and roots 59, 69 radially come in contact with another just prior to fall make up so that as the connection 10 is torque tightened to its use condition, the bearing surfaces that stress the connection 10 and resist the torsional load, are the various thread crests, roots, and flanks of the threads. The threads, and specifically the relationship between the root and crest interference and flank engagement, are so designed that these bearing stresses are evenly distributed throughout the length of the thread of the connection. Because of the helical engagement of the threads and the balance of radial force components from the stab and load flanks, hoop stresses are controlled in both the pin member 16 and box member 18. There is no radial clearance between the thread crests of one member and the roots of its mating member when the connection is fully made up.

The connection 10 forms a metal-to-metal pressure seal 46, a primary torque shoulder 43, a secondary torque shoulder 44, and self-regulating, torque-resistant threads that are not "wedge" or "dovetail" in design. The torque-resistant threads isolate the seal 46 and torque shoulders 43, 44 from deformation caused by excessive make-up torque.

The use of run-in and run-out threads eliminates substantially all grooves, gaps, and other clearances between the threads. The corner radiuses 61, 71 and corner chamfers 52, 62 may form pockets 82, 84, as shown in FIG. 8, which receive any thread lubricant used in making up the connection 10.

During the break out of the connection, the connection is unloaded from the box end down. While during make up, the connection is loaded from the pin end out.

The connection 10 achieves this torque distribution by sequentially increasing the load bearing area within the threaded portion of the connection as make-up torque is applied to the connection. Another feature of the present invention includes a connection wherein the threads totally engage to distribute all of the bearing stresses resisting torsional make up, the torque load and sealing over the entire thread length. As a result of this even distribution, the outside diameter of the connection can be made smaller while still carrying the same load as prior art connections. Likewise, full torque loading of the connection while in use is fully in the threads and distributed along the entire thread length. Therefore, an externally applied over torque will not precipitate an over torque or failure of the sealing system 46.

By distributing the applied assembly torque into the threads, the connection 10 maintains structural and pressure integrity over a much larger and higher applied torque range than the prior art with similar physical dimensions to the relatively modest slim line dimensions of this connection. The dimensioning of the pin thread relative to the box thread is such that there is contact upon final make up to provide a locking contact bearing stress around the entire thread form and over nearly the entire length of the threads, excepting the roots and crests in the run-in/run-out sections. Thus, not only the bearing stress, but also the primary external pressure and secondary internal pressure sealing and the torque loading are distributed within the threads over the entire length of threads and are not provided or shared by any other structure related or associated with the threads. The primary internal pressure sealing is of course provided by the internal pressure seal system.

The specific geometry of the thread form is important to the connection 10, i.e., a square or nearly square thread with a specific and closely controlled crest width 88, such that the opening 90 of the thread groove is only slightly larger than the width 88 of the thread tooth; thereby forming an extremely close fit upon makeup. The height of the threads is also closely controlled such that the diametrical interference is controlled both in intensity and relative location to achieve a sequential torque engagement during make-up. The substantially square threads and square grooves on the pin and box members 16, 18 with the threads being only slightly smaller than the accommodating grooves allows the connection 10 to achieve an interlocking engagement when the connection 10 is made up power tight The preferred thread/seal lock up of the present invention is achieved with the stab chamfers 52, 62 allowing the pin member 16 to stab in the box member 18 and allowing threads, which are essentially square, to mate together. In other words, the crests 58, 68 and roots 59 69 are substantially square and the chamfers 52, 62 allow the square crests 58, 68 to be received within the essentially square roots 59, 69 to provide a very tight connection. Also, the widths 88, 90 of the crests 58, 68 and roots 59, 69 are regulated so that they are almost the same thereby achieving substantially no clearance in the threads. This is permitted due to the stab flank alignment using chamfers 52, 62.

The threads lock up in an increasing torque resistance manner. In other words, the torsional resistance increases non-linearly as the make up torque is increased. Torsional resistance may be defined as resistance to a turning of one member with respect to the other member. The connection of the present invention includes a metal-to-metal seal system and threads that lock up in a thread configuration whereby the seal is locked up and insulated from the make up torsion thus providing an extremely high torque resistance.

The connection of the present invention has compression and tension characteristics which exceed those of the prior art. In the preferred embodiment, the compression characteristics of the connection are slightly better than the tensile characteristics because of the pin nose and box base engagement. In the tension mode, the efficiency of the connection or strength of the connection is a function of the cross-sectional areas of engagement of the threaded members. The cross-sectional area of the seal surfaces either at a center shoulder or at the pin nose does not add to the tension characteristics of the connection only the compression characteristics. With square threads, the areas of thread contact in both tension and compression are substantially the same. The additional area of contact of the seal surfaces in compression adds to the compression characteristics of the connection.

Figure 14:
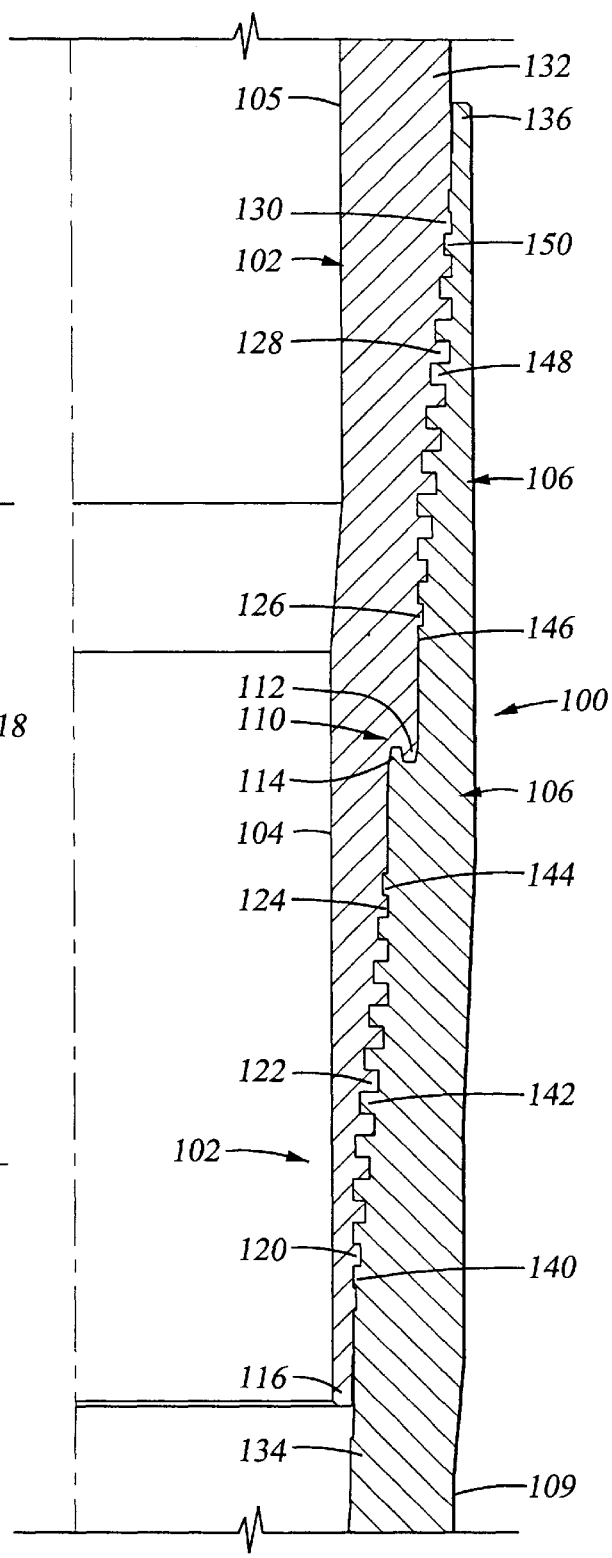
FIG. 14 is a cross section view of another embodiment of the connection of the present invention having a center shoulder seal configuration.

Referring now to FIG. 14, there is shown another embodiment of the connection of the present invention. Connection 100 includes a pin member 104 and a box member 106 formed on the end of another tubular member 108. Connection 100 further includes a center shoulder seal 110 located approximately at the longitudinal mid point of connection 100 and described in further detail in U.S. Pat. No. 5,462,315, incorporated herein by reference. The center shoulder seal 110 forms two-step threads on pin and box members 102, 106. Center shoulder seal 110 is a locked double shoulder made up of a first center shoulder configuration 112 on pin member 102 and a second center shoulder configuration 114 on box member 102.

With reference to pin member 102, run-in threads 120 extend from pin nose 116 to full height threads 122. Run-out threads 124 extend from full height threads 122 to center shoulder seal 112. Run-in threads 126 extend from center shoulder seal 112 to full height threads 128. Run-out threads 130 extend from fill height threads 128 to the base 132 of pin member 102. With respect to box member 106, run-out threads 140 extend from box base 134 to full height threads 142. Run-in threads 144 extend from full height threads 142 to center shoulder seal 114. Run-out threads 126 extend from center shoulder seal 114 to full height threads 148. Run-in threads 150 extend from full height treads 148 to pin nose 136. As shown in FIG. 8, upon assembly of connection 100, run-out threads 124 engage run-in threads 144, fill height threads 122, 142 inter-engage, and run-in threads 120 engage run-out threads 140. In addition, run-out threads 146 engage run-in threads 126, full height threads 128, 148 inter-engage, and run-in threads 150 inter-engage run-out threads 130.

The connection of the '315 patent utilize variable width threads to permit the stabbing of the threads into the accommodating grooves. The square threads or nearly square threads of the previously described with respect to FIGS. 1–13 are used in connection 100. As distinguished from the embodiments shown in FIGS. 1–13, connection 100 achieves lock up without the engagement of the pin nose against a box base. In the make-up of connection 100, additional make-up torque is applied to the connection after the center shoulder seal configuration is made up between center shoulder seals 112, 114. This additional torque increases the tension in the box member 106 between center shoulder seal 114 and box nose 136 and increases tension in the pin member 102 between center shoulder seal 112 and pin nose 116. That portion of the pin member 102 extending from center shoulder seal 112 to pin nose 116 is a thin member, particularly as compared to that portion of the box extending from center shoulder seal 114 to box base 134. Further, that portion of the box member extending from the center shoulder seal 114 to box nose 136 is also a thin member particularly as compared to that portion of the pin member extending from center shoulder seal 112 to pin base 132.

As the connection 100 is made up, the thin and thick sections of the pin member 102 are placed in compression and the thin and thick sections or portions of the box member 106 are placed in tension. This increases the bearing pressures between the load flanks. Poisson's effect on the thin portions of pin and box members 102, 106, respectively, closes the clearances between the load flanks.

Also as the thin sections of the pin and box members are placed in compression and the thick sections of the pin and box members are placed in tension, Poisson is effect causes the threads to lock up similar to that of the embodiments shown in FIGS. 1–13. Thread locking occurs because the clearances are small and the radial interferences are small such that when the center shoulder engages, tension in the box and pin members 106, 102 increases thereby amplifying Poisson's effect. The large stab on the box member 106 and the small step on the pin member 102 are the thin members. This ratio of thicknesses between the large steps and small steps of the corresponding pin and box members 102, 106 causes the locking of the threads.

The thread profile of the present invention may be used in two different types of center shoulder seal connections, namely a hot forged upset connection and a cold swedged plain end pipe (tubing). It may also be used on a swedged cold formed, cold swedged pipe for connecting casing.

While a preferred embodiment of the invention has been shown and described, modifications thereof can be made by one skilled in the art without departing from the spirit of the invention.

What is claimed is:

1. A tubular connection comprising:
   a pin member having a nose and a base with external tapered constant width threads extending from said nose to said base;
   a box member having a nose and a base with internal tapered constant width threads extending from said base to said nose;
   said external and internal tapered threads being square or near square threads having stab flanks and load flanks with thread grooves between said threads;
   said stab flanks having corner chamfers which engage upon said pin member being inserted into said box member;
   said corner chamfers guiding said threads into said thread grooves upon multiple relative rotations of said pin and box members and said pin nose engaging said box base to form a torque shoulder upon assembly.

2. The tubular connection of claim 1 wherein said threads lock up sequentially from said pin nose to said pin base.

3. The tubular connection of claim 1 wherein said pin and box members include interfering cylindrical surfaces adjacent said pin nose and box base forming a metal-to-metal seal.

4. The tubular connection of claim 1 wherein said pin nose includes a first shoulder and said box base includes a second shoulder, said first and second shoulders engaging to form said torque shoulder. engage to form a torque shoulder.

5. The tubular connection of claim 1 wherein said pin nose and box base engage to form a metal-to-metal seal.

6. The tubular connection of claim 1 wherein said load flanks have a zero degree flank angle or a negative flank angle and said stab flanks have a zero degree flank angle or a positive flank angle that is greater than said negative flank angle.

7. The tubular connection of claim 6 said negative flank angle is greater than 0 up to 6.5° and said positive flank angle is greater then 0 up to 7.5°.

8. The tubular connection of claim 1 wherein said load flanks have a positive flank angle and said stab flanks have a negative flank angle that is greater than said positive flank angle.

9. The tubular connection of claim 1 wherein said thread has a crest and a thread groove opening where said crest has a width which is at least 95% of the width of said thread groove opening.

10. The tubular connection of claim 1 further including a clearance of at least 0.002 of inch between said load flanks upon stabbing said pin member into said box member.

11. The tubular connection of claim 1 wherein said threads have crests and roots, said crests and roots having a radial interference.

12. The tubular connection of claim 1 wherein said pin member and box member are disposed on ends of tubular members, said pin and box members forming a tubular wall having a thickness between 75 and 108% of the thickness of said tubular members.

13. The tubular connection of claim 1 wherein run-in threads, full height threads, and run-out threads extend from said nose to said base of said pin and box members.

14. The tubular connection of claim 1 wherein said box base includes an annular groove receiving said pin nose.

15. The tubular connection of claim 1 wherein said threads and torque shoulder cause said pin member to contract axially and said box member to expand axially.

16. The tubular connection of claim 1 wherein said pin base engages said box nose to form a secondary torque shoulder upon assembly.

17. The tubular connection of claim 1 wherein said pin nose forms an external cylindrical sealing surface and said box base forms an internal cylindrical sealing surface, said sealing surfaces sealingly engaging upon assembly.

18. The tubular connection of claim 1 wherein said pin nose forms an external frusto conical surface and said box base forms an internal cylindrical ramp surface, said surfaces engaging upon assembly.

19. A tubular connection comprising:
a pin member having external tapered threads;
a box member having internal tapered threads;
said external and internal tapered threads being square or near square threads having stab flanks and load flanks with thread grooves between said threads;
said stab flanks having corner chamfers which engage upon said pin member being inserted into said box member;
said corner chamfers guiding said threads into said thread grooves upon relative rotation of said pin and box members;
said pin and box members each including a nose and a base;
said pin nose and box base engaging to form a metal-to-metal seal;
said pin nose including a first annular member and a pin groove, said box base including a second annular member and a box groove, said first annular member being received by said box groove and said second annular member being received by said pin groove.

20. The tubular connection of claim 19 wherein said first annular member is received in said box groove and said second annular member is received in said pin groove to form a torque shoulder.

21. The tubular connection of claim 19 wherein said first annular member includes a first cylindrical surface and a first frustoconical surface, said second annular, member forming a second cylindrical surface and a second frustoconical surface, said first and second cylindrical surfaces and first and second frustoconical surfaces sealingly engaging to form a seal.

22. A threaded pipe connection for tubular members comprising a box having tapered internal threads and a pin having tapered external threads that mate with the threads on the box when the connection is made up, said threads on the box and pin having load flanks with a negative flank angle and stab flanks with a positive flank angle that is greater than the negative flank angle of the load flanks but sufficient to guide the pin into the box, said stab flanks engaging as the pin moves into the box due to relative rotation of the pin and box, said pin having a nose and said box having a base that move into engagement during rotational make up shifting the weight of the tubular members from the stab flanks to the load flanks upon rotational make up of the threaded connection, said threads locking up sequentially from the pin nose to the nose base as the connection is fully made up.

23. A tubular connection comprising:
a pin member having tapered external threads including run-in threads, full height threads, and run-out threads extending from a nose to a base of said pin member;
a box member having tapered internal threads including run-out threads, full height threads and run-in threads extending from a base to a nose of said box member;
said threads including square or nearly square threads and accommodating grooves, said threads having crests and roots and stab and load flanks with said stab flanks having corner chamfers and a width at the thread pitch line which is substantially equal to or greater than the nominal clearance of said thread groove at the pitch line;
said thread widths forming a cam flank extending from said corner chamfer to said thread width and a second flank extending from said thread width to said root;
said pin nose engaging said box base to form a seal assembly;
a primary torque shoulder being formed by said pin nose and box base;
said box member receiving said pin member until said corner chamfers engage;
said corner chamfers guiding said stab flanks of said threads to said accommodating grooves and said cam flanks camming said stab flanks into engagement upon rotation of one of said pin or box members relative to the other member;
said stab flank engagement shifting to an engagement of said load flanks as said seal assembly is formed;

said pin nose and box base locking up as said primary torque shoulder is formed;

said threads locking up from said pin nose to said pin base as additional torque is applied to complete the make-up of the connection.

24. A method of making up a tubular connection, comprising:

stabbing a threaded pin member into a threaded box member;

engaging corner chamfers on the stab flanks of the pin and box threads;

forming a clearance between said threads;

rotating the pin and box members relative to each other;

camming said threads on the pin and box member within accommodating grooves on the corresponding pin and box member;

engaging seal surfaces on a nose of the pin member and a base of the box member;

shifting load from the stab flanks to the load flanks on the threads;

locking up the seal surfaces;

further rotating one member relative to the other member; and sequentially locking up the threads from the pin nose back to a base of said pin member.

25. The method of claim 24 further including centering the pin member within the box member.

26. The method of claim 24 further including stabbing the pin member at least half way into the box member before the corner chambers engage.

27. The method of claim 24 further including engaging the stab flanks and not engaging the load flanks as the threads are guided into the grooves.

28. The method of claim 24 wherein the engagement of said seal surfaces causes the load to shift from the stab flanks to the load flanks.

29. The method of claim 28 wherein the engagement of the load flanks drives the seal surfaces together.

30. The method of claim 24 wherein the nose of the pin member is placed in compression and the base of the box member is placed in tension.

31. The method of claim 30 wherein the compression of the pin member and the tension on the box member increases the contact between the load flanks.

32. The method of claim 30 wherein the compression of the pin member and the tension on the box member causes crests and roots on the threads to interferingly engage.

33. The method of claim 24 wherein the seal surfaces are cylindrical surfaces on the pin and box members.

34. The method of claim 24 further including camming the stab flanks together.

35. The method of claim 24 further including engaging the load flanks, crests and roots of the threads, and stab flanks at the pitch lines.

36. The method of claim 35 wherein the bearing stress loads are evenly distributed over the entire thread length.

37. The method of claim 24 wherein said seal surfaces are insulated from the make-up torque.

38. The method of claim 24 further including increasing torsional resistance with increasing make-up torque.

39. The method of claim 24 wherein said pin nose stops rotation prior to final make-up of the connection.

40. The method of claim 24 further including transferring substantially all of the remaining applied torque to the threads after the seal surfaces lock up.

41. The method of claim 24 further including forming a primary torque shoulder between the pin nose and box base.

42. The method of claim 41 further including engaging the box nose and pin base after the primary torque shoulder is formed.

43. A connection comprising:

a member having constant taper threads with grooves therebetween;

each of said threads having a crest, a root, a stab flank and a load flank, and said stab flank having a corner chamfer and at least first and second tapered surfaces.

44. The connection of claim 43 wherein said first taper provides a greater clearance between adjacent threads than said second taper.

45. A connection comprising:

a member having constant taper threads with grooves therebetween;

each of said threads having a crest, a root, a stab flank and a load flank; and said stab flank having a corner chamfer and at least first and second tapered surfaces, wherein said threads have a square or nearly square profile and said first and second surfaces are different surfaces.

46. A connection comprising:

a member having constant taper threads with grooves therebetween;

each of said threads having a crest, a root, a stab flank and a load flank;

said stab flank having a corner chamfer and at least first and second tapered surfaces wherein said first and second surfaces are different surfaces; and a third taper on said stab flank.

47. A connection comprising:

a member having constant taper threads with grooves therebetween;

each of said threads having a crest, a root, a stab flank and a load flank;

said stab flank having at least first, second, and third tapered surfaces wherein said first, second and third surfaces are different "surfaces"; and said third taper camming said threads into said grooves.

48. The connection of claim 47 wherein said threads have a square or nearly square profile.

49. A tubular connection comprising:

a pin member having external tapered threads;

a box member having internal tapered threads;

said external and internal tapered threads being square or near square threads having stab flanks and load flanks with thread grooves between said threads;

said stab flanks having corner chamfers which engage upon said pin member being inserted into said box member;

said corner chamfers guiding said threads into said thread grooves upon relative rotation of said pin and box members; and said threads having a width at the pitch line which is substantially equal to the nominal clearance of said thread groove at the pitch line.

50. The tubular connection of claim 49 wherein said thread width forms a cam flank camming said square threads into said thread grooves upon relative rotation of said pin and box members.

51. The tubular connection of claim 49 wherein said thread width cams said stab flanks into engagement.

* * * * *